(12) United States Patent
Murakami et al.

(10) Patent No.: US 8,931,028 B2
(45) Date of Patent: Jan. 6, 2015

(54) RECEIVING DEVICE

(75) Inventors: Shinichi Murakami, Tokyo (JP); Takatoshi Shirosugi, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/113,508

(22) PCT Filed: Apr. 18, 2012

(86) PCT No.: PCT/JP2012/060436
§ 371 (c)(1),
(2), (4) Date: Oct. 23, 2013

(87) PCT Pub. No.: WO2012/147580
PCT Pub. Date: Nov. 1, 2012

(65) Prior Publication Data
US 2014/0053215 A1  Feb. 20, 2014

(30) Foreign Application Priority Data

Apr. 26, 2011 (JP) .................................. 2011-098547

(51) Int. Cl.
*H04N 7/173* (2011.01)
*H04N 7/16* (2011.01)
*H04N 21/426* (2011.01)
*H04N 21/414* (2011.01)
*H04N 21/438* (2011.01)
*H04N 5/50* (2006.01)
*H04N 21/61* (2011.01)
*H04B 1/00* (2006.01)

(52) U.S. Cl.
CPC ....... *H04N 21/6112* (2013.01); *H04N 21/4263* (2013.01); *H04N 21/41422* (2013.01); *H04B 1/0064* (2013.01); *H04N 21/4383* (2013.01); *H04N 5/50* (2013.01)

USPC ........... 725/131; 725/132; 725/133; 725/134; 725/139; 725/140

(58) Field of Classification Search
USPC .......................................................... 725/62
See application file for complete search history.

(56) References Cited

U.S. PATENT DOCUMENTS 6,772,434 B1 *  8/2004  Godwin .......................... 725/68
7,369,823 B2 *  5/2008  Oiwa ............................. 455/135

(Continued)

FOREIGN PATENT DOCUMENTS

JP  2006-13945 A  1/2006
JP  2009-188880 A  8/2009

(Continued)

OTHER PUBLICATIONS

Corresponding International Search Report with English Translation dated May 29, 2012 (five (5) pages).

*Primary Examiner* — Mushfikh Alam
(74) *Attorney, Agent, or Firm* — Crowell & Moring LLP

(57) ABSTRACT

Provided is a receiving device that without interrupting a program being viewed is capable of switching the channel to the program in a destination reception area. When reception is good, a plurality of receiving units select the same channel and receive a program; and when reception worsens, the plurality of receiving units is divided into units for program reception and units for channel searching. The receiving units for program reception continue receiving the program, and the receiving units for channel searching search for a relay station and switch to a relay station channel having better reception than the channel being viewed. In a case where a relay station channel with good reception cannot be found, series broadcast stations in the same network are searched and a switch is made to a channel of a series broadcast station in the same network that has better reception than the channel being viewed.

10 Claims, 16 Drawing Sheets

(56) References Cited

U.S. PATENT DOCUMENTS

| | | | |
|---|---|---|---|
| 7,373,650 B1* | 5/2008 | Rodriguez et al. | 725/41 |
| 7,428,022 B2* | 9/2008 | Teichner et al. | 348/725 |
| 2002/0163593 A1* | 11/2002 | Liu et al. | 348/614 |
| 2006/0227255 A1* | 10/2006 | Yang | 348/837 |
| 2006/0277573 A1* | 12/2006 | Kinemura | 725/39 |
| 2008/0098439 A1* | 4/2008 | Taura et al. | 725/75 |
| 2008/0136971 A1* | 6/2008 | Fujishima et al. | 348/731 |
| 2009/0021641 A1* | 1/2009 | Matsuura et al. | 348/553 |
| 2011/0158357 A1* | 6/2011 | Djadi et al. | 375/344 |
| 2012/0008719 A1* | 1/2012 | Shirasuka et al. | 375/316 |
| 2012/0133840 A1* | 5/2012 | Shirasuka et al. | 348/732 |
| 2012/0192244 A1* | 7/2012 | Takaki et al. | 725/131 |
| 2014/0173679 A1* | 6/2014 | Kimura et al. | 725/132 |

FOREIGN PATENT DOCUMENTS

| | | |
|---|---|---|
| JP | 2010-141420 A | 6/2010 |
| JP | 2010-258650 A | 11/2010 |
| JP | 2011-49713 A | 3/2011 |
| JP | 2011-61753 A | 3/2011 |
| WO | WO 2010/131637 A1 | 11/2010 |

* cited by examiner

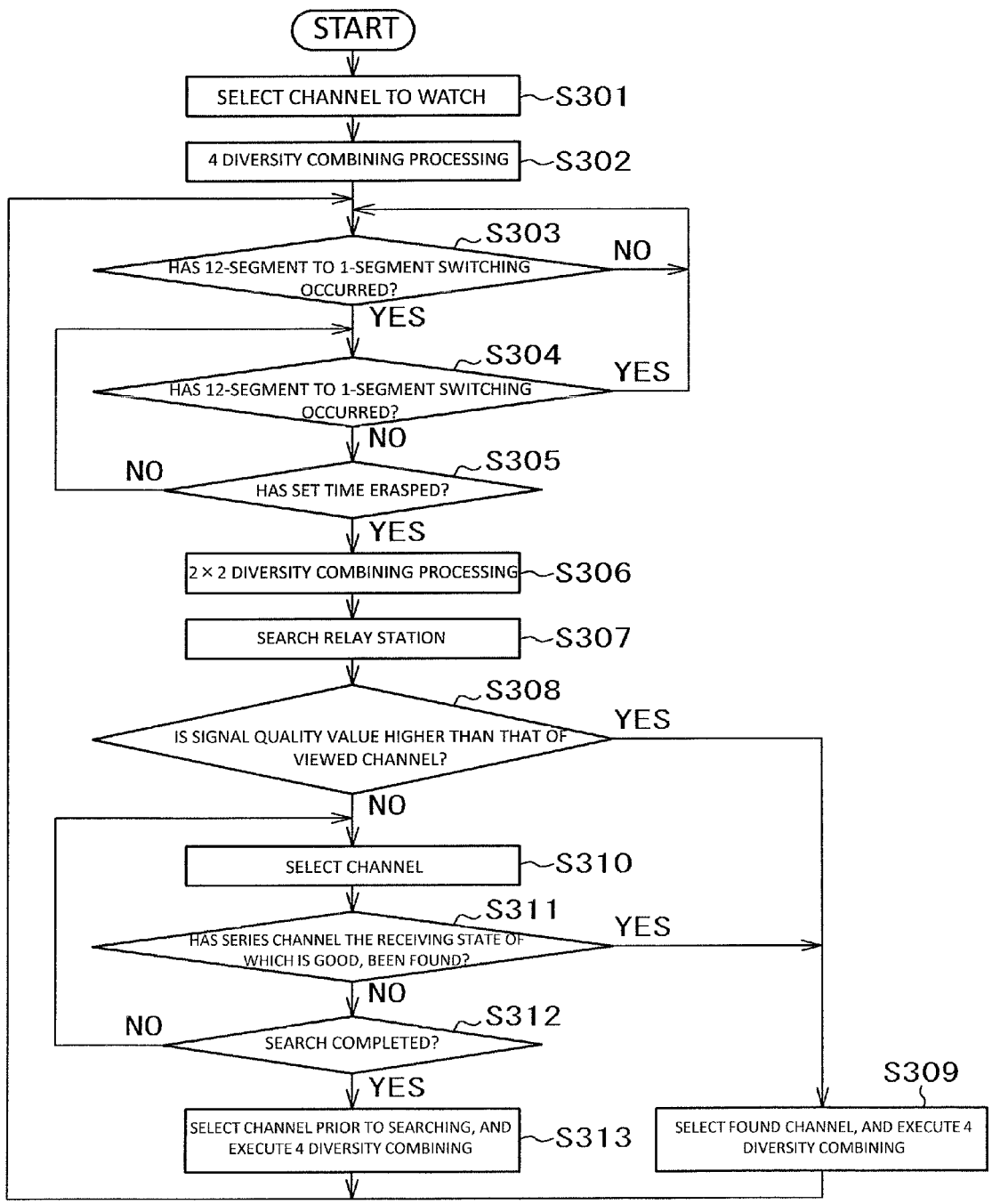

FIG. 6

| | | | TRANSMISSION CHANNEL OF | ~601 |
|---|---|---|---|---|
| YAMAGATA | | | | |
| AKITA | | | | |
| MIYAGI | | | | |
| BROADCAST STATION | GROUP ID | MASTER STATION | TRANSMISSION CHANNEL OF RELAY STATION | |
| NHK GENERAL·SENDAI | 0 | 17 | 15 18 22 25 26 42 | |
| NHK EDUCATIONAL·SENDAI | 1 | 13 | 14 16 23 26 30 40 | |
| TBC TELEVISION | 3 | 19 | 18 22 23 27 44 45 | |
| ⋮ | ⋮ | ⋮ | ⋮ | |
| KHB EAST JAPAN BROADCASTING | 5 | 28 | 16 20 30 43 50 51 | |

| REGION | NEIGHBORING REGIONS | ~602 |
|---|---|---|
| MIYAGI | IWATE FUKUSHIMA YANAGATA | |
| AKITA | IWATE YANAGATA AOMORI | |
| YAMAGATA | MIYAGI NIGATA AKITA FUKUSHIMA | |

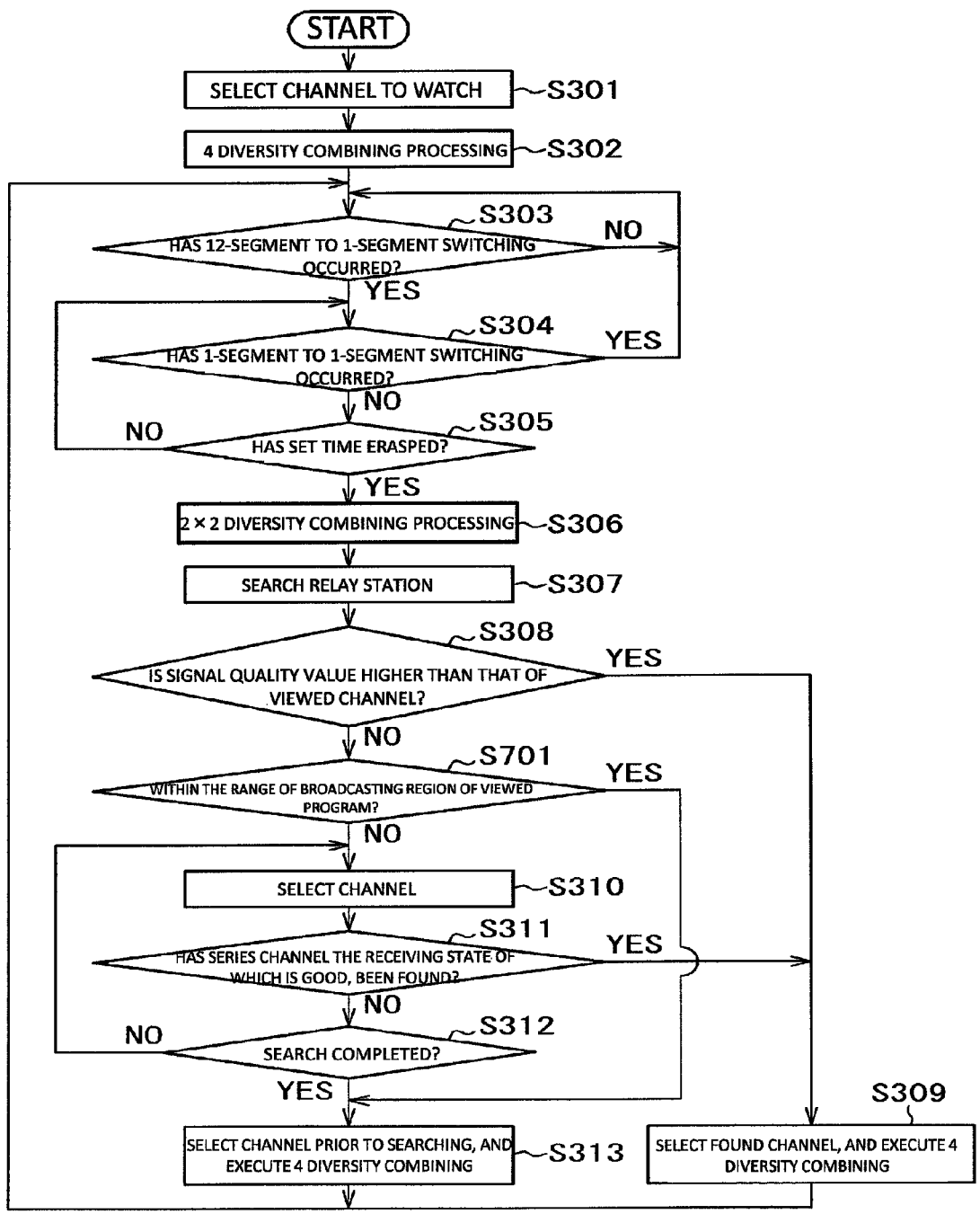

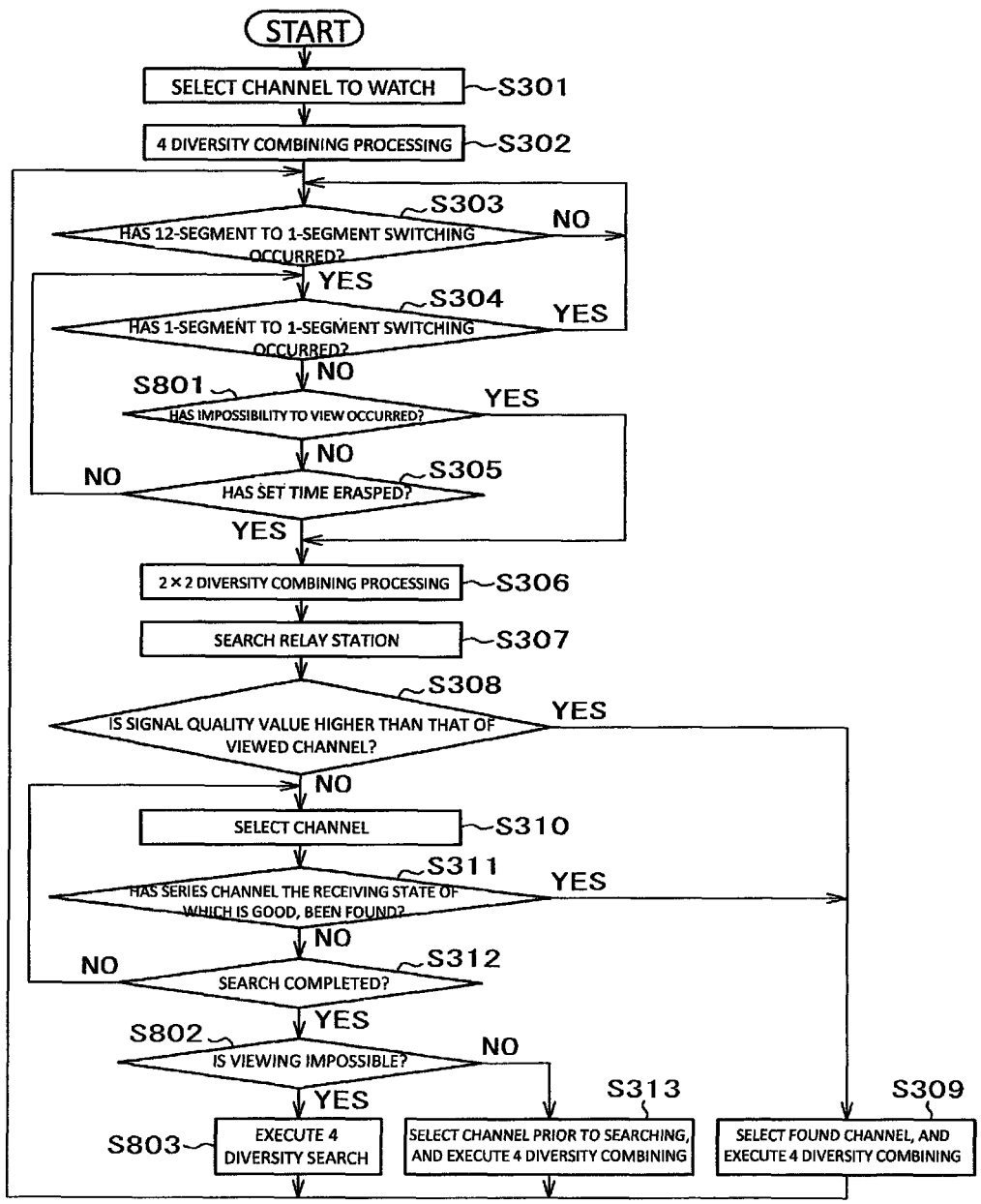

FIG. 16

| ID | REGION | ID | REGION | ID | REGION |
|---|---|---|---|---|---|
| 0 | UNDEFINED | 16 | HOKKAIDO(MURORAN) | 32 | YAMANASHI | 48 | SHIMANE |
| 1 | WIDE KANTO AREA | 17 | MIYAGI | 33 | AICHI | 49 | TOTTORI |
| 2 | WIDE KINKI AREA | 18 | AKITA | 34 | ISHIKAWA | 50 | YAMAGUCHI |
| 3 | WIDE CHUKYO AREA | 19 | YAMAGATA | 35 | SIZUOKA | 51 | EHIME |
| 4 | HOKKAIDO AREA | 20 | IWATE | 36 | FUKUI | 52 | KAGAWA |
| 5 | OKAYAMA KAGAWA | 21 | FUKUSHIMA | 37 | TOYAMA | 53 | TOKUSHIMA |
| 6 | SHIMANE TOTTORI | 22 | AOMORI | 38 | MIE | 54 | KOCHI |
| 7 | UNDEFINED | 23 | TOKYO | 39 | GIFU | 55 | FUKUOKA |
| 8 | UNDEFINED | 24 | KANAGAWA | 40 | OSAKA | 56 | KUMAMOTO |
| 9 | UNDEFINED | 25 | GUNMA | 41 | KYOTO | 57 | NAGASAKI |
| 10 | HOKKAIDO(SAPPORO) | 26 | IBARAKI | 42 | HYOGO | 58 | KAGOSHIMA |
| 11 | HOKKAIDO(HAKODATE) | 27 | CHIBA | 43 | WAKAYAMA | 59 | MIYAZAKI |
| 12 | HOKKAIDO(ASAHIKAWA) | 28 | TOCHIGI | 44 | NARA | 60 | OITA |
| 13 | HOKKAIDO(OBIHIRO) | 29 | SAITAMA | 45 | SHIGA | 61 | SAGA |
| 14 | HOKKAIDO(KUSHIRO) | 30 | NAGANO | 46 | HIROSHIMA | 62 | OKINAWA |
| 15 | HOKKAIDO(KITAMI) | 31 | NIIGATA | 47 | OKAYAMA | 63 | UNDEFINED | ic broadcasts while moving.

RECEIVING DEVICE

TECHNICAL FIELD

The present invention relates to a receiver device receiving communications and broadcasts, and in particular relates to a receiver device mounted on a movable body and receiving terrestrial digital broadcasts while moving.

BACKGROUND ART

Usually, a broadcast station expands the receiving area of broadcasting by installing a relay station at a plurality of locations within a broadcast area and sending broadcast radio waves from these relay stations. If a relay station sends a broadcast radio wave at the same frequency (SFN: Single Frequency Network), a program can be continuously viewed even if a movable body moves to other receiving area. However, if a relay station sends a broadcast radio wave at different frequency (MFN: Multi Frequency Network), when a movable body moves to other receiving area, a program that has been viewed till then cannot be received.

For this reason, particularly in a broadcast receiver device mounted on a movable body, such as a car, when it moves to other receiving area and cannot receive a program that has been viewed, there is a need to carry out channel search, search the broadcast radio wave of a receivable relay station and reestablish the channel in order to continuously view the program. While carrying out this channel search, there is an inconvenience that the program cannot be viewed.

In view of the above circumstances, patent Literature 1 discloses a method in which a main tuner for receiving programs and a sub-tuner for executing channel search are provided, and the reception intensity of each frequency is detected by searching all frequency ranges with the sub-tuner, channels having reception intensities which are equal to or higher than a threshold intensity is determined to be receivable, and the time to search channels is shortened by causing the main tuner to search only these channels.

CITATION LIST

Patent Literature

Patent Literature 1: Japanese Unexamined Patent Publication No. 2006-13945

SUMMARY OF THE INVENTION

Technical Problem

Although the above prior art has the advantage that receivable channels can be searched by the sub-tuner while viewing a program, the channel search for updating channel information is finally performed by the main tuner, and therefore the prior art has the problem that viewing of the program is paused during this period.

The present invention has been made in view of the above circumstances, and an object of the same is to provide a receiver device which can switch the channel to that of a program in the destination receiving area without discontinuing viewing of the program by efficiently searching a receivable program broadcasted by a station in the same group.

Solution to Problem

The present invention is a receiver device which receives broadcast signals, the receiver device including a plurality of receiving units which receive broadcast signals and select a predetermined channel and demodulate the same, a combining unit which combines a plurality of demodulated signals output from the plurality of receiving units, and a control unit which controls the selection operation of the plurality of receiving units and the combining processing operation of the combining unit, the control unit, when the receiving state of the broadcast radio wave is good, causing all of the plurality of receiving units to select and demodulate the same channel, and causing the combining unit to combine all of the plurality of demodulated signals to receive a program, and when the receiving state of the broadcast radio wave has deteriorated, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, and as a result of the first search, if no relay station with a better receiving state than that of the viewed channel is found, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive the program.

The present invention is also a receiver device which receives broadcast signals, the receiver device including a plurality of receiving units which receive broadcast signals and select a predetermined channel and demodulate the same, a combining unit which combines a plurality of demodulated signals output from the plurality of receiving units, a location information acquiring unit which acquires the information of the current location, a control unit which controls the selection operation of the plurality of receiving units, the combining processing operation of the combining unit, and the location information acquiring processing of the location information acquiring unit, the control unit, when the receiving state of the broadcast radio wave is good, causing all of the plurality of receiving units to select and demodulate the same channel, and causing the combining unit to combine all of the plurality of demodulated signals to receive a program, and when the receiving state of the broadcast radio wave has deteriorated, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, and as a result of the first search, if no relay station with a better receiving state than that of the viewed channel is found, comparing the current location acquired from the location information acquiring unit with a broadcasting region acquired from region identification information contained in TS of the viewed program, when the current location is within the broadcasting region, causing all of the plurality of receiving units to select and demodulate the current received channel, and causing the combining unit to combine all of the plurality of demodulated signals to receive a program, and when the current location is outside the broadcasting region, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive the program.

The present invention is also the receiver device, wherein the case where the receiving state of the broadcast radio wave has been deteriorated is a case where in the received channel, a program of weak hierarchical layer transmission in which the resistance to the influences caused by obstruction factors such as noise and fading is relatively weak cannot be viewed, and a program of a strong hierarchical layer in which the resistance to the influences caused by these is relatively strong is being viewed.

The present invention is also a receiver device which receives broadcast signals, the receiver device including a plurality of receiving units which receive broadcast signals and select a predetermined channel and demodulate the same, a combining unit which combines a plurality of demodulated signals output from the plurality of receiving units, a control unit which controls the selection operation of the plurality of receiving units and the combining processing operation of the combining unit, the control unit, when the receiving state of broadcast radio wave has been deteriorated and a program of a strong hierarchical layer has become unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, and as a result of the first search, if no relay station with a better receiving state than that of the viewed channel is found, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive a program, and when, as a result of the second search, any channel of a series broadcast station with a better receiving state than that of the viewed channel could not be found, causing the combining unit to combine the plurality of demodulated signals output by all of the plurality of receiving units, and causing all of the plurality of receiving units to search a channel a relay station or a series broadcast station of the viewed program as a third search.

The present invention is also a receiver device which receives broadcast signals, the receiver device including a plurality of receiving units which receive broadcast signals and select a predetermined channel and demodulate the same, a combining unit which combines a plurality of demodulated signals output from the plurality of receiving units, a location information acquiring unit which acquires the information of the current location, and a control unit which controls the selection operation of the plurality of receiving units, the combining processing operation of the combining unit and the location information acquiring process of the location information acquiring unit, the control unit, when the receiving state of broadcast radio wave has been deteriorated and a program of a strong hierarchical layer has become unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, and when, as a result of the first search, no channel of a relay station with a better receiving state than that of the viewed channel could be found, comparing the current location acquired from the location information acquiring unit with a broadcasting region acquired from region identification information contained in TS of the viewed program, when the current location is within the broadcasting region, causing all of the plurality of receiving units to select and demodulate the current received channel, and causing the combining unit to combine all of the plurality of demodulated signals to receive a program, and when the current location is outside the broadcasting region, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive a program, and when, as a result of the second search, any channel of a series broadcast station with a better receiving state than that of the viewed channel could not be found, causing the combining unit to combine the plurality of demodulated signals output by all of the plurality of receiving units, and causing all of the plurality of receiving units to search a channel a relay station or a series broadcast station of the viewed program as a third search.

The present invention is also the above receiver device, which, in the control unit, when the receiving state of broadcast radio wave has been further deteriorated and a program of a strong hierarchical layer is unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving unit for channel search and causing a predetermined candidate channel to be searched as a fourth search, when, as a result of the fourth search, the predetermined candidate channel is receivable, causing all of the plurality of receiving units to select and modulate the predetermined candidate channel, and causing the combining unit to combine all of the plurality of demodulated signals to receive a program, and when, as a result of the fourth search, the predetermined candidate channel is unviewable, continuing searching of the predetermined candidate channel until a predetermined time is reached, when either the current program received channel or the predetermined candidate channel has become viewable before the predetermined time is reached, causing all of the plurality of receiving units to select and demodulate the channel of the viewable one, causing the combining unit to combine all of the plurality of demodulated signals to receive a program, when both of the current program received channel and the predetermined candidate channel are unviewable until the predetermined time is reached, causing the combining unit to combine the plurality of demodulated signals output by all of the plurality of receiving units, and causing all of the plurality of receiving units to search a channel a relay station or a series broadcast station of the viewed program as a third search.

The present invention is also the receiver device wherein the channel received most recently for the currently viewed program is used as the candidate channel.

The present invention is also the receiver device wherein the receiver device further includes a location information acquiring unit which acquires of the current location information, and when the current location of a receiver is different from the broadcasting region of the viewed program, the channel received most recently for the currently viewed program is used as the candidate channel for a series broadcast station whose broadcasting region is the current location of the receiver.

The present invention is also the receiver device wherein when the first search is performed on the viewed program, the channel selected most recently which was receivable but its receiving state was worse than that of the viewed channel is used as the candidate channel.

The present invention is also the receiver device wherein the receiver device further includes a location information acquiring unit which acquires of the current location information, if the current location of a receiver is different from the broadcasting region of the viewed program, the channel selected most recently which was receivable but its receiving state was worse than that of the viewed channel when the second search is performed for the viewed program is used as the candidate channel for a series broadcast station whose broadcasting region is the current location of the receiver.

The present invention is also the receiver device wherein the channel which is searched when a relay station search is executed search target channels of the viewed program preset in advance at the time of product shipment and are channels with the channel information used by the relay station described in the NIT of the viewed program channel added.

The present invention is also a receiver device which receives broadcast signals, the receiver device including a plurality of receiving units which receive broadcast signals and select a predetermined channel and demodulate the same, first and second combining/decoding units which combine a plurality of demodulated signals output by the plurality of receiving units to perform transmission line decoding, a decoding unit which performs demultiplexing/decoding processing on either one of TS signal of the TS signals output by the first and second combining/decoding units and outputs video and audio signals, and a control unit which controls the selection operation of the plurality of receiving units, the operation of the first and second combining/decoding units and the operation of the decoding unit, when demodulated signals output from one or more receiving units (first receiving group) which are selecting the first channel of the plurality of receiving units are provided to the first combining/decoding unit, and demodulated signals output from one or more receiving units (second receiving group) which are selecting the second channel of the plurality of receiving units are provided to the second combining/decoding unit, and the TS signal output from the first combining/decoding unit is supplied to the decoding unit to perform a demultiplexing/decoding processing on the first channel, since all of the plurality of receiving units are selecting the second channel and the decoding unit performs a demultiplexing/decoding processing on the second channel, the control unit first causing the first combining/decoding unit to stop outputting the TS signal to the decoding unit, and cause the TS signal output by the second combining/decoding unit to be supplied to the decoding unit, and subsequently cause the first receiving group to select the second channel, and then cause the demodulated signal output by the first receiving group to be provided to the second combining/decoding unit, controls to cause the second combining/decoding unit to combine the demodulated signal output by the first and second receiving groups and perform transmission line decoding.

The present invention is also the receiver device wherein the receiver device is so configured that a decoding unit which further inputs the TS signal, performs a demultiplexing/decoding processing on the same, and outputs video and audio signals is provided, any one of a plurality of TS signals output by the combining unit is supplied to the decoding unit, and that switching control of the signal supplied to the decoding unit is the switching control described above.

Advantageous Effects of Invention

The present invention is capable of efficiently searching a receivable program, and switching the channel to that of a program in the destination receiving area without discontinuing viewing of the program.

BRIEF DESCRIPTION OF DRAWINGS

FIG. 3 is a flowchart showing the operation of a control unit 17.

FIG. 6 is database information contained by a control unit 17.

FIG. 7 is a flowchart showing the operation of the control unit 17 in a second embodiment.

FIG. 8 is a flowchart showing the operation of the control unit 17 in a third embodiment.

FIG. 16 is a list of broadcasting regions.

DESCRIPTION OF EMBODIMENTS

Embodiments of the present invention will be described below in detail with reference to drawings.

It should be noted that the receiver device in the embodiments of the present invention can receive broadcast signals of ISDB-T (Integrated Services Digital Broadcasting for Terrestrial) that is the transmission system of terrestrial digital broadcasting in Japan, and decode the video/audio signals in the form of MPEG2-TS (Transport Stream) (hereinafter, referred to as a TS signal). In ISDB-T, hierarchical transmission of up to three hierarchical layers can be carried out by dividing one channel of transmission band into 13 segments and combining the respective segments.

At present, by utilizing this hierarchical transmission, a high quality broadcast for fixed receiving terminals using 12 segments (hereinafter, referred to as 12-segment broadcast) and a low quality broadcasting for portable receiving terminals using one remaining segment (hereinafter, referred to as one-segment broadcast) are carried out. In the 12-segment broadcast and the one-segment broadcast, simultaneous broadcast (Simulcast) for broadcasting the same program content is the main stream. Here, the 12-segment broadcast is a broadcast with a large transmission capacity and high quality, but has a weak noise resistance and cannot be correctly decoded or viewed unless the receiving state of a broadcast radio wave is relatively good. On the other hand, the one-segment broadcast is a broadcast with a small transmission capacity and low quality, but has a strong noise resistance and can be correctly viewed even if the receiving state of a broadcast radio wave relatively deteriorates. The receiver device in the embodiments of the present invention has a function to receive both the 12-segment broadcast and the one-segment broadcast, and can select either one of the video/audio signals of the 12-segment broadcast or the one-segment broadcast depending on whether the receiving state of a broadcast radio wave is good or bad, and output the same to a display, a speaker, or the like.

FIG. 16 shows the region identification allocation (ARIB TR-B14), and each broadcasting organization provides relay stations for transmitting the same program so that the broadcasting can be universally received in the allocated broadcasting target region. The receiver device in the embodiments of the present invention has a function to search relay stations related to the viewed program. Moreover, broadcasting organizations which are in such a relationship that performs mutual distribution of broadcast programs for the purpose of performing program distribution beyond the broadcasting region or for other purposes are referred to as series stations, and the receiver device in the embodiments of the present invention has a function to search series broadcast stations of the viewed program.

Example 1

Figure 1:
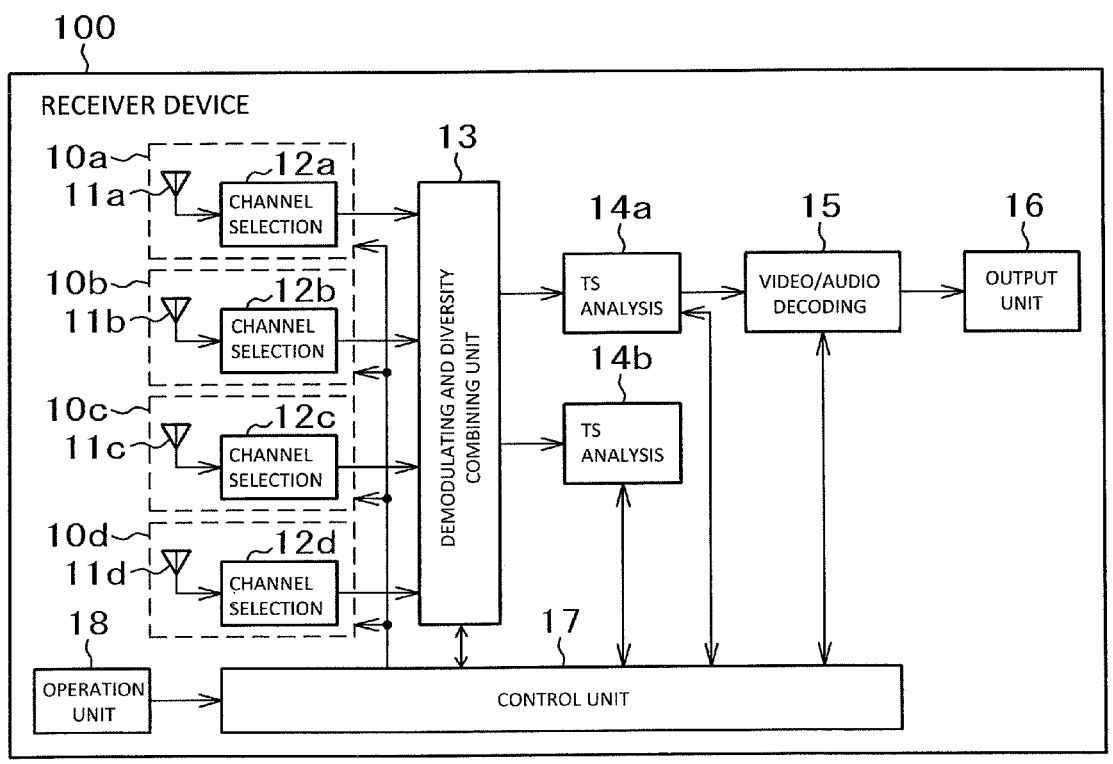
FIG. 1 is a block diagram showing the constitution of a receiver device 100 in a first embodiment.

FIG. 1 is a block diagram showing the constitution of the receiver device 100 in the first embodiment.

In this figure, 10a shows a first tuning unit, and an antenna unit 11a, and a channel selection unit 12a. The antenna unit 11a receives broadcast radio waves, and supplies the same to the channel selection unit 12a. The channel selection unit 12a extracts, from the supplied broadcast radio waves, a channel specified by the control unit 17 to be described later and performs a frequency conversion processing on the extracted channel and supplies a desired channel signal to the demodulating and diversity combining unit 13.

Moreover, 10b to 10d show second to fourth tuning units, and the tuning unit 10b includes an antenna unit 11b and a channel selection unit 12b, the tuning unit 10c includes an antenna unit 11c and a channel selection unit 12c, and the tuning unit 10d includes an antenna unit 11d and a channel selection unit 12d, respectively. The antenna units 11b to 11d have the same configuration as the antenna unit 11a, and the channel selection units 12b to 12d as the channel selection unit 12a, so the description thereof is omitted.

Figure 2A:
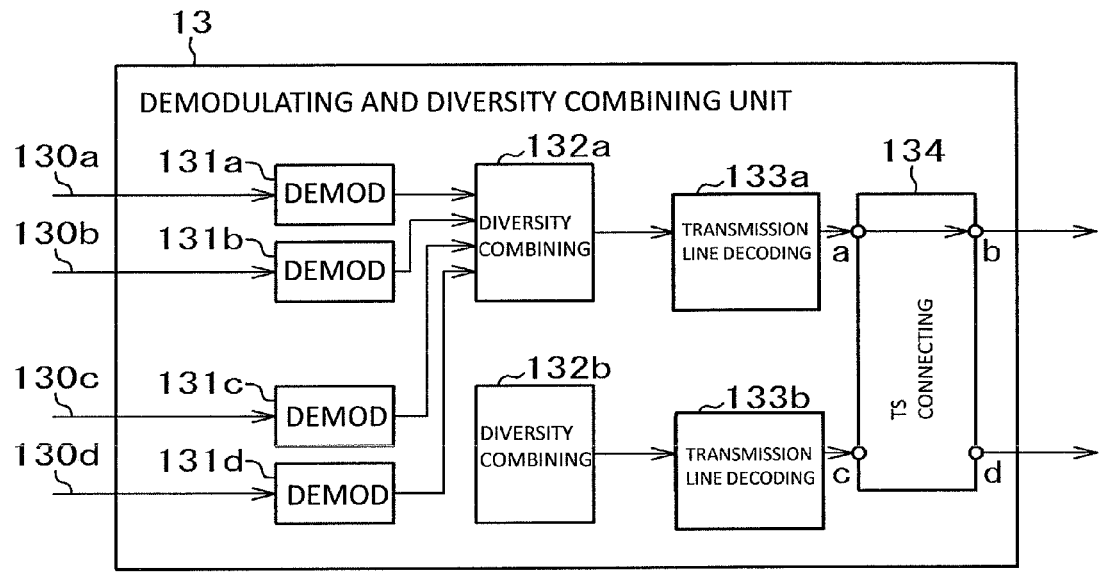
FIGS. 2A and 2B are block diagrams showing the constitution of a demodulating and diversity combining unit 13.

FIG. 2 is a block diagram showing the constitution of a demodulating and diversity combining unit 13.

In FIG. 2(a), 130a to 130d show channel signals supplied from the tuning units 10a to 10d, respectively. The demodulating units 131a to 131d carry out OFDM (Orthogonal Frequency Division Multiplexing) demodulation on the respective channel signals 130a to 130d, and supply demodulated signals to the diversity combining unit 132a. The diversity combining unit 132a performs a diversity combining processing on the supplied four demodulated signals. Specifically, for a plurality of sub-carriers extracted in the course of the respective OFDM demodulations, a maximum ratio combining method of weighting and combining for each sub-carrier is used. Transmission line decoding is performed on the diversity combining signal after being subjected to the diversity combining processing in a transmission line decoding unit 113a. The thus-extracted TS signal is output to a TS analysis unit 14a via a TS connecting unit 134 (a-terminal to b-terminal).

Figure 2B:
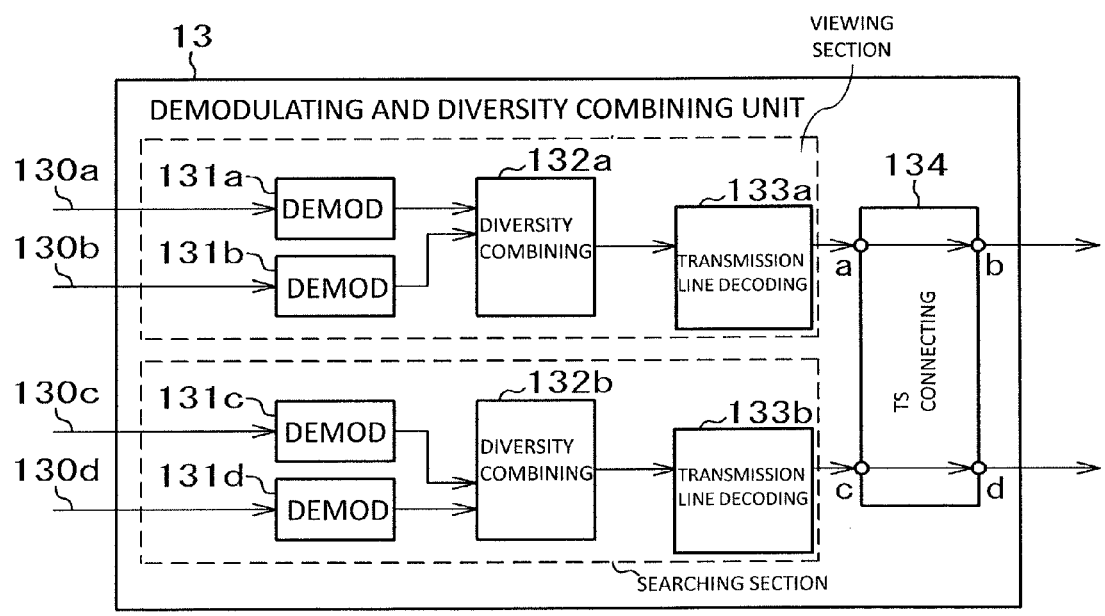

Moreover, the demodulating and diversity combining unit 13 includes a diversity combining unit 132b and a transmission line decoding unit 133b. As shown in FIG. 2(b), the diversity combining unit 132a can perform a diversity combining processing on the two demodulated signals supplied from the demodulating units 131a and 131b, and the diversity combining unit 132b can also perform a diversity combining processing on the two demodulated signals supplied from the demodulating units 131c and 131d. At this time, the diversity combining signal which has been subjected to the diversity combining processing in the diversity combining unit 132b is subjected to transmission line decoding in the transmission line decoding unit 133b, and the thus-extracted TS signal is output to the TS analysis unit 14b via the TS connecting unit 134 (c-terminal to d-terminal).

However, the combination of the demodulated signal and demodulating unit on which the diversity combining units 132a and 132b performs the diversity combining processing is not limited to that mentioned above.

Furthermore, the method of diversity combining processing in the demodulating and diversity combining unit 13 is not limited to the maximum ratio combining method, but, for example, the selective combining method in which a channel signal of the maximum power is selected and other channel signals are discarded, the equal gain combining method in which the phases of the signals of channels are equalized and combined, among others, can be used.

Herein, the higher the number of demodulated signals on which the diversity combining processing is performed in the diversity combining unit 132a or 132b, the higher the noise resistance and the better the receiving state can be maintained during travelling.

In contrast, the demodulating and diversity combining unit 13, in carrying out the OFDM demodulation and the transmission line decoding, extracts information (hereinafter, referred to as a signal quality value) indicative of the quality of a received signal, such as BER (Bit Error Rate), PER (Packet Error Rate), CNR (Carrier to Noise Ratio), a received power, or a synchronized state, and supplies the same to the control unit 17. Hereinafter, it is defined that the higher the signal quality value, the better the receiving state, and the lower the signal quality value, the worse the receiving state.

The TS analysis unit 14a extracts PSI (Program Specific Information) and SI (Service Information) from the TS signals supplied from the b-terminal of the TS connecting unit 134, and supplies the same to the control unit 17. Moreover, the TS analysis unit 14a extracts an identifier (PID: Packet Identifier) of a TS packet containing video and audio from the extracted PSI/SI, filters the TS signals with each PID, and outputs video TS packets and audio TS packets to a video audio decoding unit 15. Moreover, the TS analysis unit 14*b* extracts PSI/SI from TS signals supplied from the d-terminal of the TS connecting unit 134 as the TS analysis unit 14*a*, and supplies the same the control unit 17.

The video audio decoding unit 15 decodes the TS packets of video and audio supplied from the TS analysis unit 14*a*, and supplies the decoded video/audio signals to an output unit 16 composed of a display, a speaker and the like. The video audio decoding unit 15*a* is capable of decoding both 12-segment broadcast encoded by MPEG-2 (Moving Picture Experts Group 2) and one-segment broadcast encoded by H.264. The video audio decoding unit 15*a* supplies either one of the video and audio signals of the 12-segment broadcast and the one-segment broadcast to the output unit 16 in accordance with an instruction from the control unit 17.

The output unit 16 includes a display, a speaker and the like, and displays the supplied video signals on the display. Moreover, the supplied audio signals are output by the speaker.

The control unit 17 controls the operations of the functional blocks contained in the entire receiver device 100 and the receiver device 100.

An operation unit 18 includes, for example, a channel selection button displayed on the display of the output unit 16, or a channel selection button of a remote control unit. When a user performs a channel selection operation using these, the channel selection information will be supplied to the control unit 17.

Herein, the algorithm for the video audio decoding unit 15 to determine which of the video/audio signals of 12-segment broadcast and those of one-segment broadcast are to choose will be described. The control unit 17 monitors the signal quality value of the viewed channel supplied from the demodulating and diversity combining unit 13. When the signal quality value meets predetermined conditions, the control unit 17 controls the video audio decoding unit 15 to output the 12-segment broadcast output, while when the signal quality value does not meet the predetermined conditions, the control unit 17 controls the video audio decoding unit 15 to output the one-segment broadcast. As the aforementioned predetermined conditions, for example, it is to be controlled that 12-segment broadcast is output when the BER of 12-segment broadcast is equal to or higher than a signal quality value equivalent to 1E-3, while one-segment broadcast is output when the value is equal to or lower than a signal quality equivalent to 1E-3. Moreover, for example, the receiving state of broadcast radio wave is greatly varied during travelling of the vehicle, and therefore when a plurality of signal quality values regularly acquired all fails, output is switched from 12-segment broadcast to one-segment broadcast, while when the regularly acquired plurality of signal quality values are all good, output is switched from one-segment broadcast to 12-segment broadcast. Accordingly, occurrence of frequent switching between 12-segment broadcast and one-segment broadcast can be reduced.

The receiving operation of the receiver device 100 will be described below with reference to FIG. 3.

FIG. 3 is a flowchart showing the operation of the control unit 17 in the first embodiment.

When a user performs a channel selection operation, the channel selection information will be supplied from the operation unit 18 to the control unit 17, a receiving operation is started according to the flowchart in this figure.

First, in Step S301, the control unit 17 sets a corresponding receiving channel to the tuning units 12*a* and 12*d*, respectively, based on the channel selection information supplied from the operation unit 18.

Next, in step S302, the control unit 17, as shown in FIG. 2(*a*), causes the diversity combining unit 132*a* to perform a diversity combining processing using four demodulated signals, and outputs the TS signal extracted from the transmission line decoding unit 133*a* to the TS analysis unit 14*a* via the TS connection unit 134 (a-terminal to b-terminal). The video/audio signals decoded by the video audio decoding unit 15 are supplied to the output unit 16. By the above-described processing, a user can view a desired broadcast program.

Subsequently, in step S303, the control unit 17 monitors, in the algorithm of the above-described switching between 12-segment broadcast and one-segment broadcast, whether or not switching from 12-segment broadcast to one-segment broadcast has occurred. If switching from 12-segment broadcast to one-segment broadcast has not occurred, that is, when the user is viewing 12-segment broadcast, the determination of step S303 is repeated until switching to one-segment broadcast occurs. When switching from 12-segment broadcast to one-segment broadcast has occurred, the flow proceeds to step S304. However, in the case where one-segment broadcast is being viewed since 12-segment broadcast is unviewable when the 4 diversity combining processing in the aforementioned step S302 is completed, the flow is to proceed to step S304 without carrying out the determination of this step S303.

In step S304, contrary to the aforementioned step S303, it is determined whether or not switching from one-segment broadcast to 12-segment broadcast has occurred. the flow returns to step S303 when switching to 12-segment broadcast has occurred, and the flow proceeds to step S305 when one-segment broadcast is continuously viewed. Subsequently in step S305, it is determined whether or not a set time has elapsed since the time of determination "YES" in step S303. The flow returns to step S304 if the time is less than the set time, and the flow proceeds to step S306 if the set time is reached.

Next in step S306, to continuously receive the program and execute channel search simultaneously, as shown in FIG. 2(*b*), the control unit 17 causes the diversity combining unit 132*a* to separate two demodulated signals supplied from the demodulating units 131*c* and 131*d* from the diversity combining processing, and to perform a diversity combining processing using the demodulated signals of the demodulating units 131*a* and 131*b* (hereinafter the demodulating units 131*a* and 131*b*, diversity combining unit 132*a*, and transmission line decoding unit 133*a* are referred to as the viewing section). Moreover, the control unit 17 outputs the demodulated signals of the demodulating units 131*c* and 131*d* separated from the diversity combining unit 132*a* to the diversity combining unit 132*b*, and the diversity combining unit 132*b* performs a diversity combining processing using these two demodulated signals (hereinafter the demodulating units 131*c* and 131*d*, diversity combining unit 132*b*, and transmission line decoding unit 133*b* are referred to as the searching section). It should be noted that the demodulated signals supplied to the diversity combining units 132*a* and 132*b* are not limited to those mentioned above, and a diversity combining processing can be also performed by using any given two demodulated signals.

By dividing the diversity combining processing using four demodulated signals in such a manner to perform two-section operation of the viewing section and searching section, the improving effect in noise resistance due to the diversity combining processing is reduced, but continuously receiving the program and executing channel search simultaneously is enabled.

Next in step S307, the channel of a relay station is searched by using the searching section side of the demodulating and diversity combining unit 13. The specific search procedure will be shown below.

First, the control unit 17 selects any one of the channels used by the relay station for the channel selection units 12c c and 12d belonging to the searching section side. As a result, the channel signals 130c and 130d supplied to the demodulating and diversity combining unit 13 are subjected to a demodulating processing at the demodulating units 131c and 131d, and the demodulated signals are subjected to a diversity combining processing at the diversity combining unit 132b, subjected to a transmission line decoding at the transmission line decoding unit 133b, and TS signals are extracted via the TS connecting unit 134 (c-terminal to d-terminal). The control unit 17 acquires the signal quality value of the channel from the searching section, and, for example, determines whether or not broadcast signals exist in the channel from a synchronous state or the like. When it is determined that no broadcast signal exists in the channel, the flow proceeds to a searching processing for the other channels used by the relay station described later. When it is determined that broadcast signals exist in the channel, the TS analysis unit 14b is caused to extract PSI/SI from the TS signals supplied to the TS analysis unit 14b, and to output the same to the control unit 17. The control unit 17 refers to NIT (Network Information Table) which is one of PSI/SI, and determines whether or not the network ID (network_id) contained in NIT matches the network ID of the viewed program. It can be determined to be a relay station when the network ID matches, while it is determined not to be a relay station when the network ID does not match. When the channel is determined to be a relay station, the signal quality value of the channel is acquired from the searching section side of the demodulating and diversity combining unit 13, and the value is contained in a memory. Herein, the memory is not shown in FIG. 1, but it may be inside the control unit 17, or in any position which is accessible from the control unit 17.

The search processing described above is executed on all channels used by the relay station. It should be noted that the information relating to all channels used by the relay station is described in the NIT of the viewed program, and the control unit 17 contains the channel information of the relay station described in the NIT of the viewed program in advance in the memory before this search processing is executed. However, there is no guarantee that all channel information actually used is described in the channel information of the relay station described in the NIT. Therefore, the channel information of the relay station which is actually used may be investigated and preset at the shipment of the receiver device, and if channels other than the channel preset are present when the NIT of the viewed program is referred to, the channels may be added to the memory.

Next in step S308, the control unit 17 first acquires the signal quality value of the viewing section from the demodulating and diversity combining unit 13, and confirms the receiving state of the currently viewed channel. Then, the signal quality value of the viewing section and the best signal quality value (However, the signal quality value of the currently viewed channel is excluded) acquired in the aforementioned step S307 are compared, and when the former is greater, the flow proceeds to step S310, while when the latter is greater, the flow proceeds to step S309.

Figure 4:
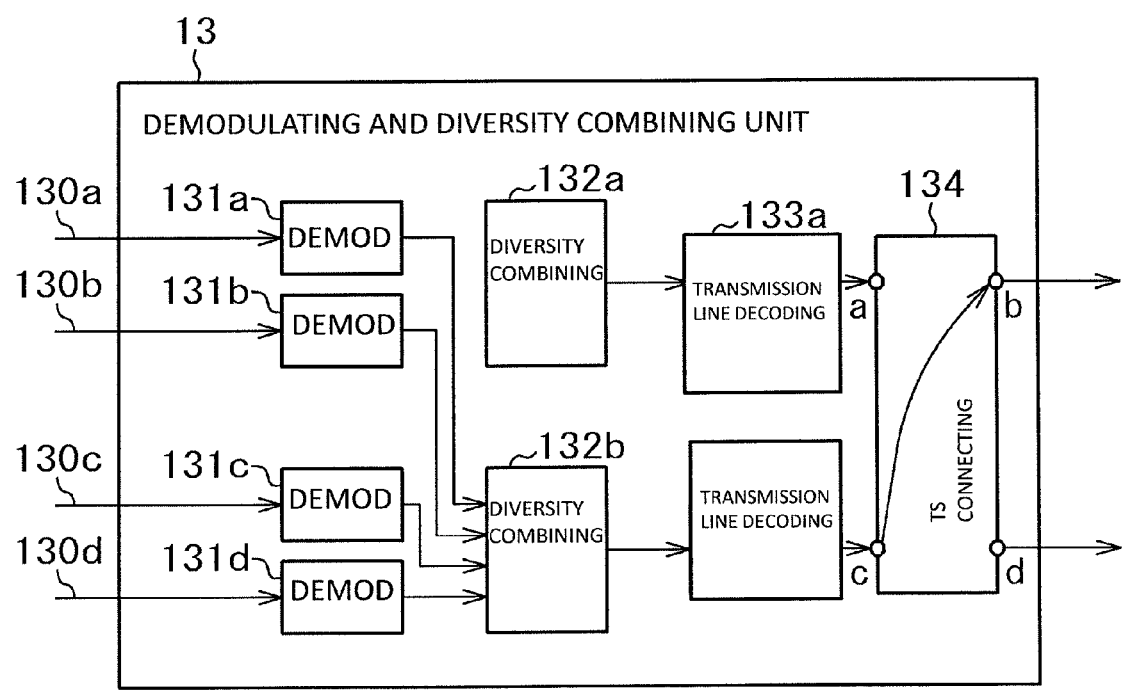
FIG. 4 is a block diagram showing the constitution of the demodulating and diversity combining unit 13 at the time of channel switching.

In step S309, a processing of switching the viewed channel to the channel having the best signal quality value found in step S307 is performed. Specifically, as shown in FIG. 4, the control unit 17 first causes the channel selection units 12c and 12d to select the channel to be switched to. Next, the control unit 17 connects the c-terminal and b-terminal of the TS connecting unit 134, and supplies the TS signal of the searching section to the TS analysis unit 14a. Subsequently, the control unit 17 causes the channel selection units 12a and 12b to select the channel to be switched to, supplies the demodulated signal of the demodulating units 131a and 131b to the diversity combining unit 132b, and causes the diversity combining unit 132b to perform a diversity combining processing using four demodulated signals. However, in the process of step S311 described later, when it is determined that the channel to be switched to is a series broadcast station, the stream content of the TS signal is different from that of the program viewed up to that point, and therefore when the terminal to be connected by the above-described TS connecting unit 134 is changed, the decoding processing is reset on the video audio decoding unit 15. The processing described above allows performing smooth channel switching.

In contrast, in step S308, when it is determined that the channel of any relay station having a better signal quality value than that of the viewed channel could not be found, the channel of a series broadcast station of the viewed program in other regions is searched in steps S310 to S312. The specific search procedure will be shown below.

First, in step S310, the control unit 17 selects a first channel for the channel selection units 12c and 12d based on "the order of selecting channels in searching series stations" described later.

Next, step S311 will be described. As a result of selecting in the aforementioned step S310, the channel signals 130c and 130d supplied to the demodulating and diversity combining unit 13 are subjected to a demodulating processing at the demodulating units 131c and 131d. The demodulated signals are subjected to a diversity combining processing at the diversity combining unit 132b, and subjected to a transmission line decoding at the transmission line decoding unit 133b so that the TS signal is extracted. The control unit 17 acquires the signal quality value of the channel from the searching section, and for example, determines from the synchronous state or the like whether or not the broadcast signal exists in the channel. When it is determined that no broadcast signal exists in the channel, the processing of step S311 is paused, and the flow proceeds to step S312. When it is determined that broadcast signals exist in the channel, the TS analysis unit 14b is caused to extract PSI/SI from the TS signals supplied to the TS analysis unit 14b, and to output to the control unit 17.

The control unit 17 refers to BIT (Broadcaster Information Table), which is one of PSI/SI information, and determines whether or not the group ID (affiliation_id) contained in the BIT matches the group ID of the viewed program. When the group ID's match, it can be determined to be a series broadcast station, while when the groups ID's do not match, it can be determined not to be a series broadcast station. When it is determined that the channel is a series broadcast station, the control unit 17 acquires the signal quality value of the channel from the searching section side of the demodulating and diversity combining unit 13 and the signal quality value of the currently viewed channel from the viewing section, respectively, to compare the two values. When the signal quality value of the searching section is greater, the flow proceeds to step S309, while when the signal quality value of the viewing section is greater, the flow proceeds to step S312. In step S309, as already described, a switching processing to the channel of the series broadcast station found is carried out, so that the channel can be switched to that of a series station having a better receiving state than that of the currently viewed program.

In step S312, based on "the order of selecting channels in searching series stations" described later, when a channel to be searched next exists, the flow returns to step S310, and the next channel is selected. Where no channel to be searched next exists, the flow proceeds to step S313. In step S313, the control unit 17 causes the channel selection units 12c and 12d to select the currently viewed channel. Then, the control unit 17 causes the demodulating and diversity combining unit 13, as shown in FIG. 2(*a*), to cause the diversity combining unit 132a to perform a diversity combining processing using four demodulated signals. Accordingly, when any channel of a relay station or a series broadcast station having a better receiving state than that of the currently viewed channel could not be found, the receiving constitution can be returned to that prior to the channel search.

Herein, two examples of the above-mentioned "the order of selecting channels in searching series stations" will be described.

A first example is a method of selecting channels in the ascending order or descending order of the channel numbers for all channels used in terrestrial digital broadcasting (channel 13 to 62. Channel 13 to 52 since Jul. 25, 2012). This method is advantageous in that it has a simpler method of determining the channel selection order than the second example described later.

The second example is a method of efficiently searching series broadcast stations utilizing the location information of the receiver and the database information contained in the memory. The details will be described below.

Figure 5:
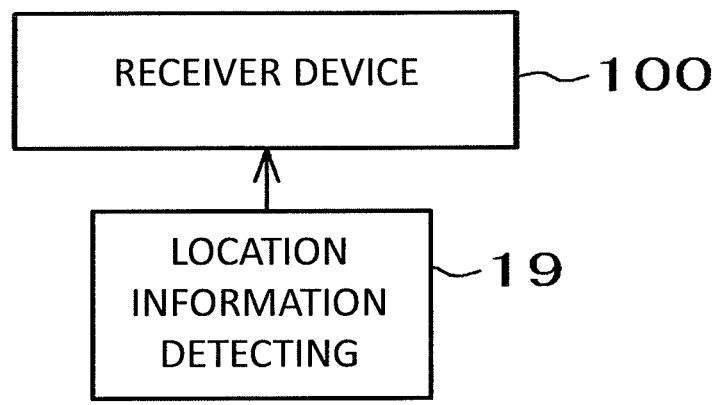
FIG. 5 is a block diagram with a location information detecting unit 19 added to the receiver device 100.

FIG. 5 is a constitution with a location information detecting unit 19 which is capable of acquiring the current location of the receiver by utilizing GPS (Global Positioning System) and the like added to the receiver device 100 shown in FIG. 1.

FIG. 6 is database information contained in advance in the control unit 17. 601 is a broadcast station database which organizes information such as the group ID of broadcast stations and the transmission channels of relay stations using broadcasting regions as units, while 602 is a neighboring region database which organizes the information of neighboring regions of the respective broadcasting regions.

The control unit 17 acquires position information from the location information detecting unit 19, and grasps the broadcasting region in which the receiver is currently located, investigates a series broadcast station in the broadcasting region in which the receiver is currently located based on the group ID from the broadcast station database 601, and selects the transmission channels of the relay station of the broadcast station sequentially. For example, when the group ID of the viewed program=3, and the broadcasting region in which the receiver is currently located is "Miyagi", the control unit 17 selects in order the transmission channels 18, 19, 22, 23, 27, 44, and 45 of the relay station used by TBC television having group ID=3.

Moreover, when no series broadcast station with a good receiving state can be found by searching the above-mentioned channels, the control unit 17 refers to the neighboring region database 602, investigates regions neighboring the broadcasting region in which the receiver is currently located, and sequentially selects the channels of the relay stations used by the series broadcast stations existing in the respective neighboring regions. For example, when the group ID of the viewed program=3, and the broadcasting region in which the receiver is currently located is "Miyagi", "Iwate", "Fukushima", and "Yamagata" are extracted as neighboring regions from the neighboring region database 602, and the transmission channels of the relay stations used by the broadcast stations having the group ID=3 in the respective neighboring regions are searched in order from the broadcast station database 601. A more detailed position of the current location of the receiver in the "Miyagi" region can be known from the location information detecting unit 19, multiple neighboring regions can be searched in the order of priority with reference to the result, whereby the efficiency in searching the series broadcast stations can be improved.

Furthermore, when no series broadcast station with a good receiving state can be found by searching the above-mentioned channels, the control unit 17 sequentially selects the channels which have not been selected yet, among all channels used in the terrestrial digital broadcasting.

As mentioned above, according to this embodiment, receiving of the program is only performed when high-quality 12-segment broadcast can be viewed, and when the radio wave state of the viewed program deteriorates so that 12-segment broadcast is unviewable, the channels of the relay stations can be searched while one-segment broadcast is viewed, and the channel can be switched to a channel of a relay station with a better receiving state than that of the viewed channel for viewing. Moreover, when no channel of the relay station with a good receiving state could be found, the channels of series broadcast stations can be searched, and if there is any series broadcast station with a better receiving state than that of the viewed channel, the channel can be switched to that broadcast station for viewing.

Example 2

FIG. 7 is a flowchart showing the operation of the control unit 17 in the second embodiment. The difference between the flowchart In this figure and the flowchart which shows the operation of the control unit 17 in the first embodiment shown in FIG. 3 is the addition of the determination processing of step S701. Moreover, the constitution of the receiver device 100 in the second embodiment, is similar to the block diagram shown in FIG. 1, and the current location of the receiver is notified from the location information detecting unit 19 to the receiver device 100 as in FIG. 5.

The receiving operation of the receiver device 100 will be described below with reference to FIG. 7 in FIG. 7, the steps referred to by the same numbers as in the flowchart shown in FIG. 3 indicate the same processings, and the description thereof is omitted.

In step S308, in the case of NO determination, that is, when no channel of a relay station with a better receiving state than that of the viewed channel could be found, the flow proceeds to step S701. In step S701, the control unit 17 acquires position information from the location information detecting unit 19, and determines whether or not the broadcasting region of the viewed program matches the broadcasting region in which the receiver is currently located. When the broadcasting region in which the receiver is currently located and the broadcasting region of the viewed program match, the flow proceeds to the aforementioned step S313, channel search is completed without searching the channel of a series broadcast station. Moreover, when the broadcasting region in which the receiver is currently located and the broadcasting region of the viewed program does not match, the flow proceeds to step S310, and as in the first embodiment, a series broadcast station is searched.

Herein, as for the information relating to the broadcasting region of the viewed program, the most significant 6 bits of service ID (service_id) contained in the PSI/SI of the viewed program are assigned as region identification and can be known by referring to this identification numbers. Alternatively, when the broadcast station database 601 shown in FIG.

6 is contained in the memory, if the name of the broadcast station of the viewed program is described in the broadcasting region in which the receiver is currently located, it can be determined that the broadcasting region in which the receiver is currently located and the broadcasting region of the viewed program match.

As mentioned above, according to this embodiment, when the radio wave state of the viewed program deteriorates so that 12-segment broadcast is unviewable, the channels of the relay stations can be searched while one-segment broadcast is viewed, and the channel can be switched to a channel of a relay station with a better receiving state than that of the viewed channel and viewed. Moreover, when no channel of the relay station with a good receiving state could not be found, if the broadcasting region in which the receiver is currently located is located outside the broadcasting region of the viewed program, the channels of series broadcast stations in the broadcasting region in which the receiver is currently located can be searched, and if there is any series broadcast station with a better receiving state than that of the viewed channel, the channel can be switched to that broadcast station for viewing. Moreover, when the broadcasting region in which the receiver is currently located and the broadcasting region of the viewed program match, the possibility that the viewed channel is switched to a series broadcast station is low (YES in step S701). Therefore, the time required to perform channel search can be shortened by not searching for series broadcast stations, and a reduction in the receiver sensitivity caused by the reduction of the number of the tuning units used to view the program during channel search from 4 to 2 can be suppressed to a short period of time.

Example 3

FIG. 8 is a flowchart showing the operation of the control unit 17 in the third embodiment. The difference between the flowchart In this figure and the flowchart which shows the operation of the control unit 17 in the first embodiment shown in FIG. 3 is the addition of steps S801 to S803.

The receiving operation of the receiver device 100 will be described below with reference to FIG. 8. It should be noted that in FIG. 8, the steps referred to by the same numbers as in the flowchart shown in FIG. 3 indicate the same processings, and the description thereof is omitted.

Step S801 is repeatedly executed when one-segment broadcast is viewed and the time elapsed since "YES" determination has been made in step S303 is less than a set time. In step S801, the control unit 17 determines whether or not 12-segment broadcast and one-segment broadcast are viewable, if both 12-segment broadcast and one-segment broadcast become unviewable, the flow proceeds to step S306, and when 12-segment broadcast or one-segment broadcast is viewable, the flow proceeds to step S305. Herein, the determination whether or not one-segment broadcast is viewable is, for example, can be made by acquiring the BER of one-segment broadcast from the demodulating and diversity combining unit 13, and determining that the broadcast is unviewable when $BER \geq 1E-2$, while it is viewable when $BER < 1E-2$. Alternatively, by acquiring the BER values of a plurality of one-segment broadcast, and determining that the broadcast is unviewable when $BER \geq 1E-2$ in all of these value, and that it is viewable when $BER < 1E-2$ in all of the BER values of a plurality of one-segment broadcast, frequent switching can be reduced. Furthermore, for example, when both 12-segment broadcast and one-segment broadcast are unviewable, if the display of the output unit 15 has a function to indicate messages such as "cannot receive signals" thereon, it may be determined that both 12-segment broadcast and one-segment broadcast are unviewable in synchronization with the message display.

Due to the aforementioned step S801, when the receiving state of broadcast radio wave deteriorates while one-segment broadcast is viewed so that both 12-segment broadcast and one-segment broadcast are unviewable, channel search can be executed immediately. Moreover, since program reception is continued and channel search is executed simultaneously, viewing of the program is enabled when the state of radio wave has improved, and when any relay station or series broadcast station with a good receiving state is found by channel search, the channel can be switched to that channel and viewed.

Next, in step S312, when the determination is "YES" and the search processing of series broadcast stations is terminated, the flow proceeds to step S802. In step S802, the control unit 17 acquires the signal quality value of the viewing section from the demodulating and diversity combining unit 13, determines whether or not the currently viewed channel can be viewed, and when both 12-segment broadcast and one-segment broadcast are unviewable, the flow proceeds to step S803. Moreover, when 12-segment broadcast or one-segment broadcast is viewable, the flow proceeds to the aforementioned step S313, and program viewing by the 4 diversity combining processing before the channel search is performed.

In step S803, the control unit 17 first stops the demodulating processing of the demodulating units 131c and 131d, then supplies the demodulated signals of the demodulating units 131c and 131d to the diversity combining unit 132a, and causes the diversity combining unit 132a to perform a diversity combining processing using four demodulated signals. Thereafter, the control unit 17 performs the search processing of relay stations and series broadcast stations using the four tuning units 10a to 10d. Specifically, as in the aforementioned steps S307 and S308, the control unit 17 searches all channels used by the relay station, and selects the channel of the relay station with the best receiving state. Moreover, when no receivable relay station can be found, the control unit 17 searches series broadcast stations as in the aforementioned steps S310 to S312, and when any receivable series broadcast station is found, the channel is selected. Furthermore, when no series broadcast station could be found, the control unit 17 repeatedly searches relay stations and series broadcast stations until any receivable relay station or series broadcast station is found.

Upon performing steps S802 and S803, when both 12-segment broadcast and one-segment broadcast of the currently viewed channel are unviewable, and no channel of the relay station or series broadcast station could be found by the channel search using the two tuning units 10c and 10d performed simultaneously, the searching of channels with high receiver sensitivity can be performed using the four tuning units 10a to 10d including the tuning units 10a and 10b of the viewed channel.

Example 4

Figure 9:
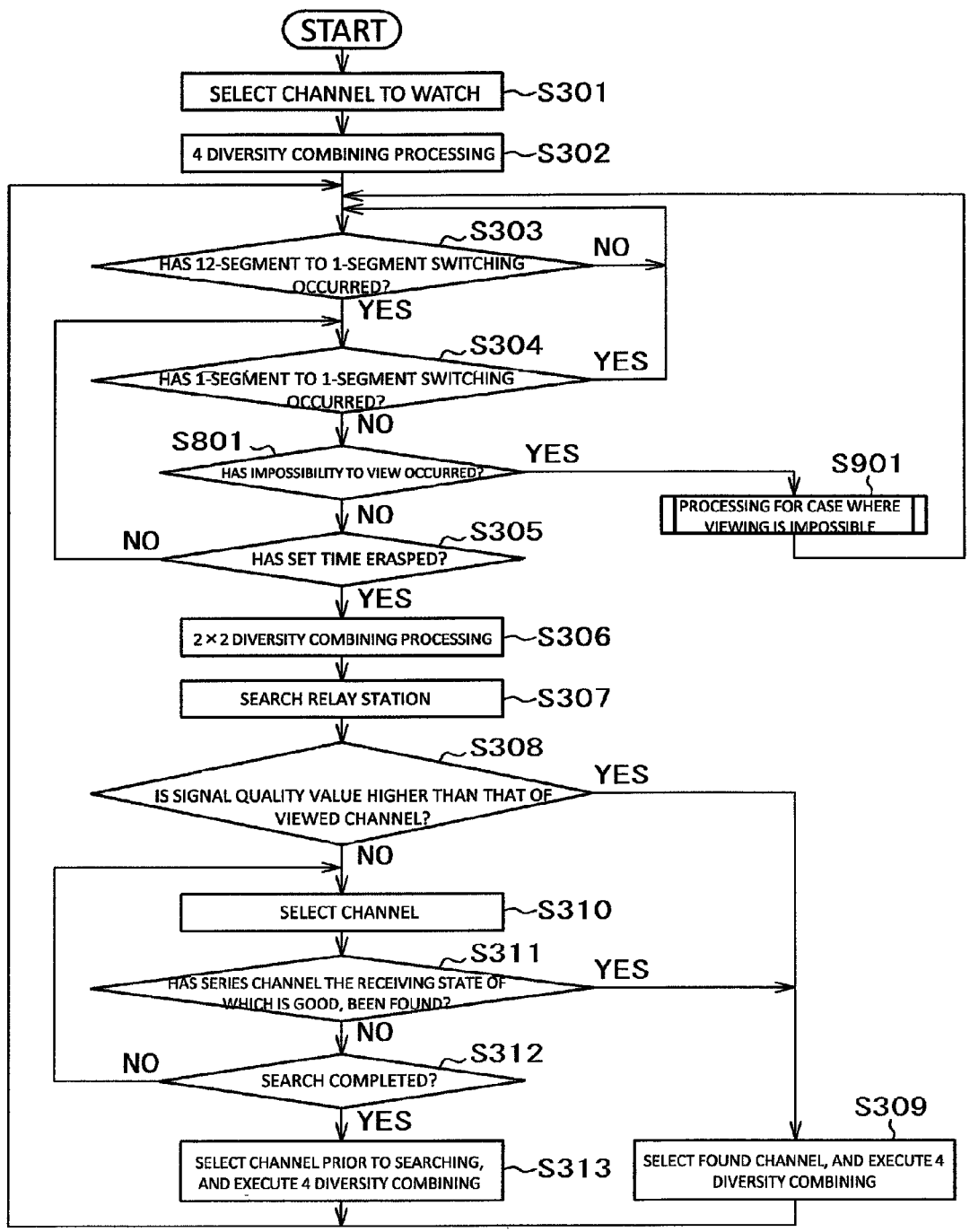
FIG. 9 is a flowchart showing the operation of the control unit 17 in a fourth embodiment.

FIG. 9 is a flowchart showing the operation of the control unit 17 in the fourth embodiment. The difference between the flowchart In this figure and the flowchart which shows the operation of the control unit 17 in the first embodiment shown in FIG. 3 is the addition of steps S801 and S901.

The receiving operation of the receiver device 100 will be described below with reference to FIG. 9. It should be noted that in FIG. 9, the steps referred to by the same numbers as in the flowchart shown in FIG. 3 indicate the same processings, and the description thereof is omitted.

Step S801 is repeatedly executed when one-segment broadcast is viewed and the time since "YES" determination has been made in step S303 is less than a set time. In step S801, the control unit 17 determines whether or not 12-segment broadcast and one-segment broadcast are viewable, and if both 12-segment broadcast and one-segment broadcast become unviewable, the flow proceeds to step S901, and when 12-segment broadcast or one-segment broadcast is viewable, the flow proceeds to step S305. Herein, the determination whether or not one-segment broadcast is viewable can be made by, for example, acquiring the BER of one-segment broadcast from the demodulating and diversity combining unit 13, and determining that it is unviewable when BER≥1E-2, while it is viewable when BER<1E-2. Moreover, when, for example, one-segment broadcast is unviewable, if the display of the output unit 15 has a function to indicate messages such as "cannot receive signals" thereon, it may be determined that both 12-segment broadcast and one-segment broadcast are unviewable in synchronization with the message display.

Figure 10:
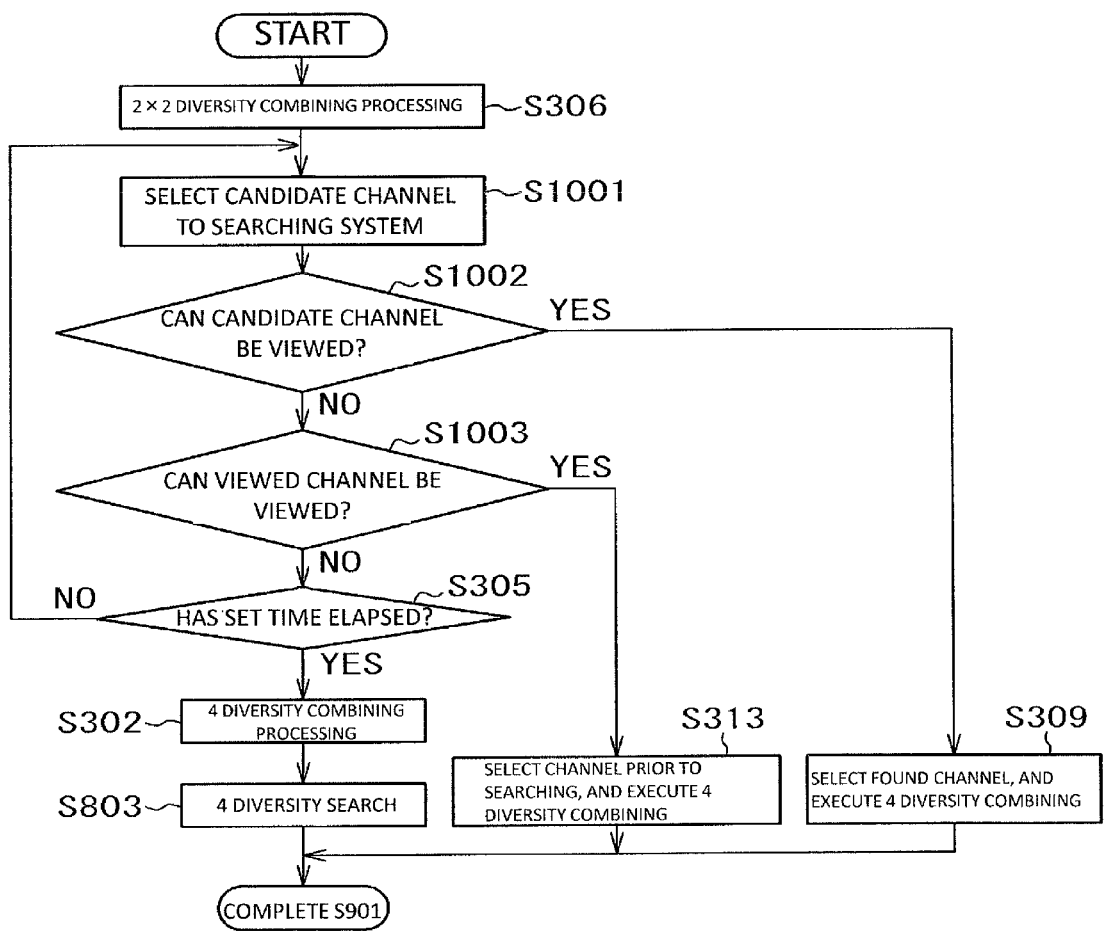
FIG. 10 is a flowchart showing in detail the operation of step S901.

Next, the process procedure of step S901 will be described in detail with reference to FIG. 10. FIG. 10 is a flowchart which shows the operation of step S901.

In FIG. 10, firstly in step S306, the control unit 17, as shown in FIG. 2(b), causes the diversity combining unit 132a to separate two demodulated signals supplied from the demodulating units 131c and 131d from the diversity combining processing, and to perform a diversity combining processing using the demodulated signals of the demodulating units 131a and 131b. Moreover, the control unit 17 outputs the demodulated signals of the demodulating units 131c and 131d separated from the diversity combining unit 132a to the diversity combining unit 132b, and causes the diversity combining unit 132b to perform a diversity combining processing using these two demodulated signals. It should be noted that the demodulated signals supplied to the diversity combining units 132a and 132b are not limited to those mentioned above, and a diversity combining processing can be also performed by using any given two demodulated signals.

Next, in step S1001, the control unit 17 selects the channel of a relay station or series broadcast station which is expected to be receivable at the current location (hereinafter referred to as candidate channel) excluding the viewed channel for the channel selection units 12c and 12d assigned to the searching section. It should be noted that the candidate channel may be one or more, and how to select the candidate channel will be described later.

Subsequently, in step S1002, the control unit 17 first acquires the signal quality value of the searching section from the demodulating and diversity combining unit 13, and determines whether or not 12-segment broadcast or one-segment broadcast of the candidate channel is viewable. When 12-segment broadcast or one-segment broadcast of the candidate channel is viewable, the control unit 17 extracts the network ID and group ID from the PSI/SI of the candidate channel supplied from the TS analysis unit 14b, and confirms whether or not the candidate channel is a relay station or a series broadcast station. If the candidate channel is a relay station or a series broadcast station, the flow proceeds to step S309, and when both 12-segment broadcast and one-segment broadcast of the candidate channel are unviewable, or when 12-segment broadcast or one-segment broadcast of the candidate channel is viewable but it is not a relay station or a series broadcast station, the flow proceeds to step S1003.

In step S309, the processing of switching the candidate channel to the viewed channel is performed. Specifically, as shown in FIG. 4, the control unit 17 first connects the c-terminal and b-terminal of the TS connecting unit 134, causes the channel selection units 12a and 12b to select the candidate channel, supplies the demodulated signals of the demodulating units 131a and 131b to the diversity combining unit 132b, and causes the diversity combining unit 132b to perform a diversity combining processing using four demodulated signals. However, when the candidate channel is a series broadcast station, the stream content of the TS signal is different from that of the program viewed up to that point, and therefore when the terminal to be connected by the above-described TS connecting unit 134 is changed, the decoding processing is reset on the video audio decoding unit 15.

Next in step S1003, the control unit 17 acquires the signal quality value of the viewing section from the demodulating and diversity combining unit 13, and determines whether or not the viewed channel is receivable. When the state of the radio wave improves and the viewed channel becomes receivable, the flow proceeds to step S313. In step S313, as mentioned above, the control unit 17 causes the demodulating units 131c and 131d to select the viewed channel, supplies the demodulated signals of the demodulating units 131c and 131d to the diversity combining unit 132a, and causes the diversity combining unit 132a to perform a diversity combining processing using four demodulated signals. This allows program viewing using the four tuning units 10a to 10d.

In step S305, whether or not a set time has elapsed from the time when both 12-segment broadcast and one-segment broadcast of the viewed channel have become unviewable in step S801 shown in FIG. 9 is determined. When the time elapsed is less than the set time, the flow returns to step S1001, while when the set time is reached, the flow proceeds to step S302.

In step S1001, when multiple candidate channels are present, every time the processing of step S1001 is performed, other candidate channels are sequentially selected.

In steps S302 and S803, as already mentioned, the channel of a receivable relay station or a series broadcast station is repeatedly searched until found using the four tuning units 10a to 10d.

Herein, an example of how to select the candidate channel will be described.

The control unit 17 contains the channel which has been viewed immediately before for each broadcast station in the memory, and selects the channel which was viewed most recently as a candidate channel for the currently viewed program. For example, in the case where it travels between two relay areas repeatedly, the channel which was viewed most recently is most likely to be receivable, where this method is effective. Moreover, a plurality of channels which have been previously viewed may be used as candidate channels, sequentially from the channel which was viewed most recently. When the broadcast station has not been viewed previously, as shown in FIG. 6, the channel transmitted by the station which has the most centric function (master station) may be contained in the memory in advance for each broadcast station, and the transmission channel of the master station of the broadcast station may be selected as the candidate channel.

Moreover, as another example, the control unit 17 acquires position information from the location information detecting unit 19, and when the broadcasting region in which the receiver is currently located is different from the broadcasting region of the viewed program, the channel which was viewed most recently can be selected as a candidate channel for the series broadcast station whose broadcast area is the broadcasting region in which the receiver is currently located. Moreover, a plurality of channels which have been previously viewed may be used as candidate channels, sequentially from the channel which was viewed most recently.

Moreover, as another example, the control unit 17 in the searching of relay stations in the aforementioned steps S307 and S308, the channels which are relay stations but the channel was not switched to those channels because their receiving states were worse than that of the viewed channel can be contained in the memory, and the channel which was contained in the memory most recently may be selected as a candidate channel, or a plurality of channels previously contained in the memory may be used as candidate channels sequentially from the channel which was contained in the memory most recently. Moreover, as another example, the control unit 17, in the searching series stations of the aforementioned steps S310 to S312, can contain the channels whose series broadcast stations were found but to which the channel was not switched in the memory, and when the broadcasting region in which the receiver is currently located is different from the broadcasting region of the viewed program acquired from the location information detecting unit 19, the channel which was contained in the memory most recently may be selected as a candidate channel for the series broadcast station whose broadcast area is the broadcasting region in which the receiver is currently located, or a plurality of channels previously contained in the memory may be used as candidate channels sequentially from the channel which was contained in the memory most recently.

Accordingly, when the receiving state of broadcast radio wave deteriorates while one-segment broadcast is viewed, and one-segment broadcast becomes unviewable, one or more channels which are likely to have the best receiving state other than the viewed channel can be selected as candidate channels, and whether or not 12-segment broadcast and one-segment broadcast are viewable can be confirmed. Moreover, whether or not the candidate channel is viewable is confirmed while reception of the program is continued, whereby when the receiving state of the viewed channel improves and 12-segment broadcast or one-segment broadcast becomes viewable again, confirmation of viewing of the candidate channel can be paused and viewing of the program by the four tuning units can be performed again. In addition, when one-segment broadcast of the candidate channel becomes viewable, the viewing can be switched to that of the candidate channel.

Example 5

Figure 11:
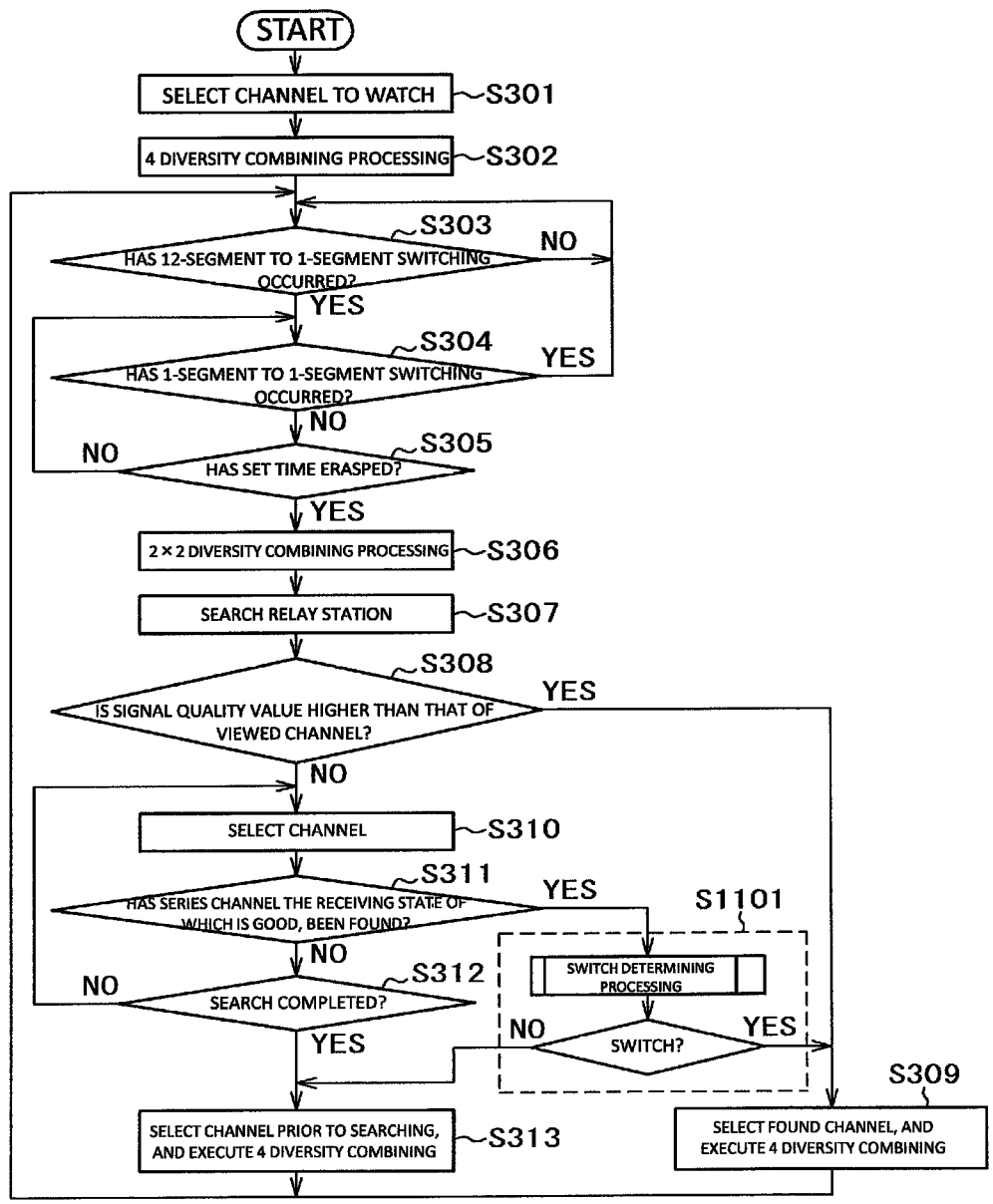
FIG. 11 is a flowchart showing the operation of the control unit 17 in a fifth embodiment.

FIG. 11 is a flowchart showing the operation of the control unit 17 in the fifth embodiment.

The difference between the flowchart In this figure and the flowchart which shows the operation of the control unit 17 in the first embodiment shown in FIG. 3 is the addition of step S1101.

Step S1101 is a processing for determining, when the channel of a series broadcast station is found, whether or not to switch the viewed program to this series station in step S311.

The specific process procedure of step S1101 will be described with reference to FIG. 12 to FIG. 15.

Figure 12:
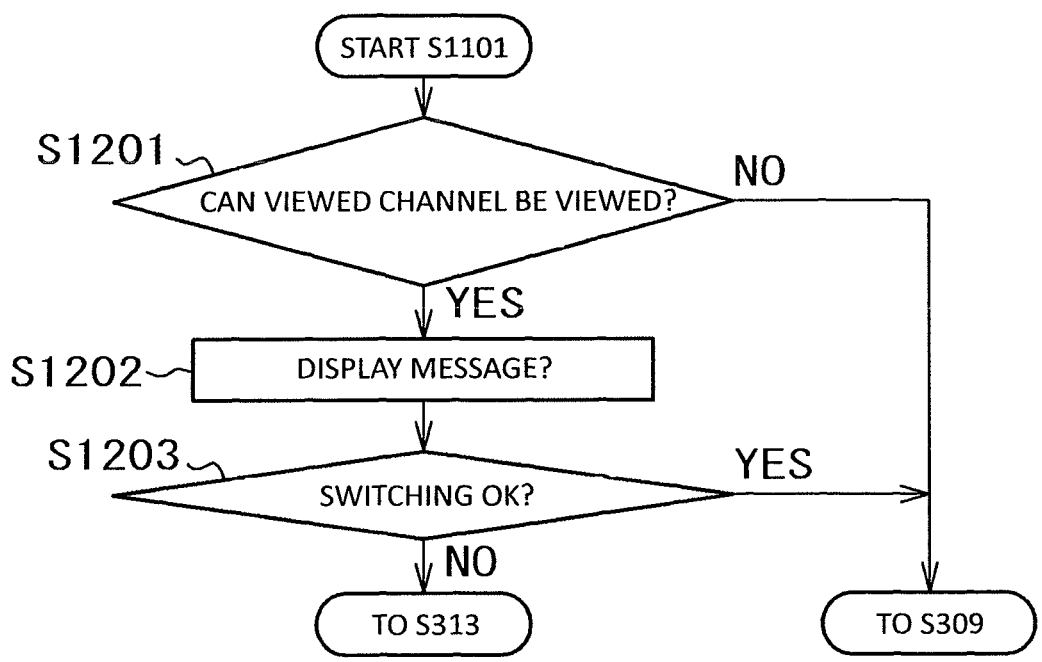
FIG. 12 is a first example of a flowchart showing in detail the operation of step S1101.

FIG. 12 is a first example of the process procedure in step S1101.

In step S1201, the control unit 17 acquires the signal quality value of the viewing section from the diversity combining and demodulating unit 13, and determines whether or not 12-segment broadcast or one-segment broadcast of the viewed channel is viewable. When 12-segment broadcast or one-segment broadcast of the channel is unviewable, the flow proceeds to step S309, and a processing for switching the viewed channel to the channel of the series broadcast station found in step S311 is performed. Moreover, when 12-segment broadcast or one-segment broadcast of the channel is viewable, the flow proceeds to step S1202. In step S1202, the user is prompted to confirm whether or not switching to a series broadcast station is to be performed. For example, it is so configured to indicate the messages "Switch to series station?" "YES" and "No" on the display, and allow the user to select either "YES" or "No". At this time, the program contents of the series station to be switched to can be indicated so that the user can use the information as a basis for making a decision.

In step S1203, when the user instructs that switching to the series broadcast station can be performed, the flow proceeds to step S309, and a processing for switching the viewed channel to that of the series broadcast station, while when the user instructed not to perform the switching, the flow proceeds to step S313, where the channel search is terminated without performing switching to the series broadcast station and viewing of the channel is continued.

By the processing described above, the user is prompted to instruct whether or not to switch the channel before switching the channel to the series station which may not broadcast the same program, whereby a considerate receiving operation can be performed for the user who wishes to continue viewing the program which has been viewed up to that point.

Figure 13:
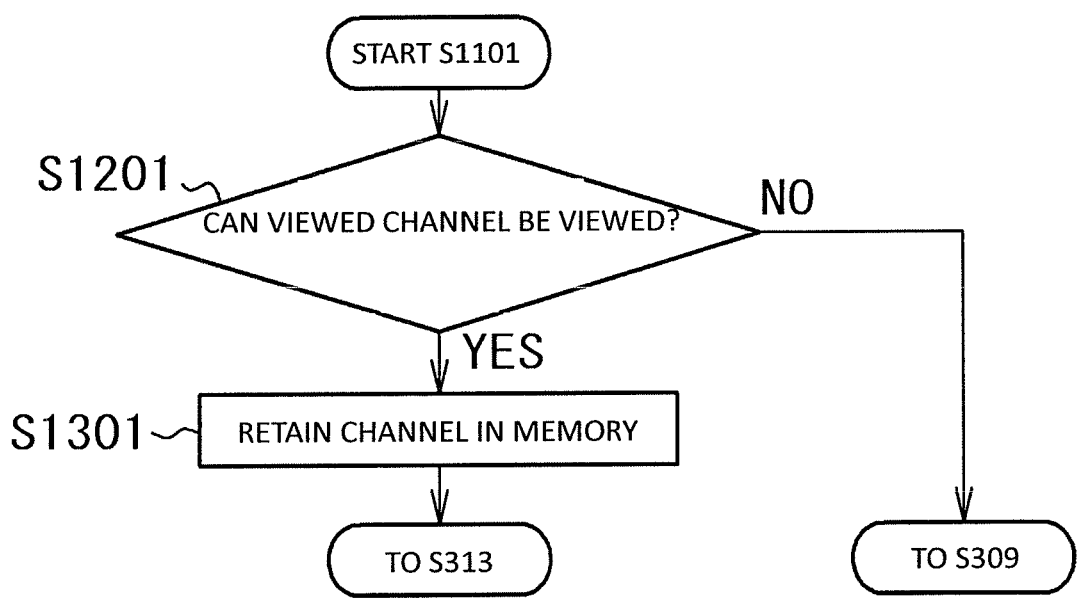
FIG. 13 is a second example of a flowchart showing in detail the operation of step S1101.

FIG. 13 is a second example of the process procedure in step S1101.

First, in the aforementioned step S1201, the control unit 17 acquires the signal quality value of the viewing section from the diversity combining and demodulating unit 13, and determines whether or not 12-segment broadcast or one-segment broadcast of the viewed channel is viewable. When 12-segment broadcast or one-segment broadcast of the channel is unviewable, the flow proceeds to step S309 for switching the channel to the found channel of a series broadcast station, and when 12-segment broadcast or one-segment broadcast of the channel is viewable, the flow proceeds to step S1301. In step S1301, after the channel of the series broadcast station found is retained in the memory, the flow proceeds to step S313, where the channel search is terminated and viewing of the channel is continued. The channel retained in step S1301 is used as a channel to be searched first in a next process (steps S310 to S312) to search a series broadcast station. Accordingly, the process time for searching the channel of the series broadcast station can be shortened.

Figure 14:
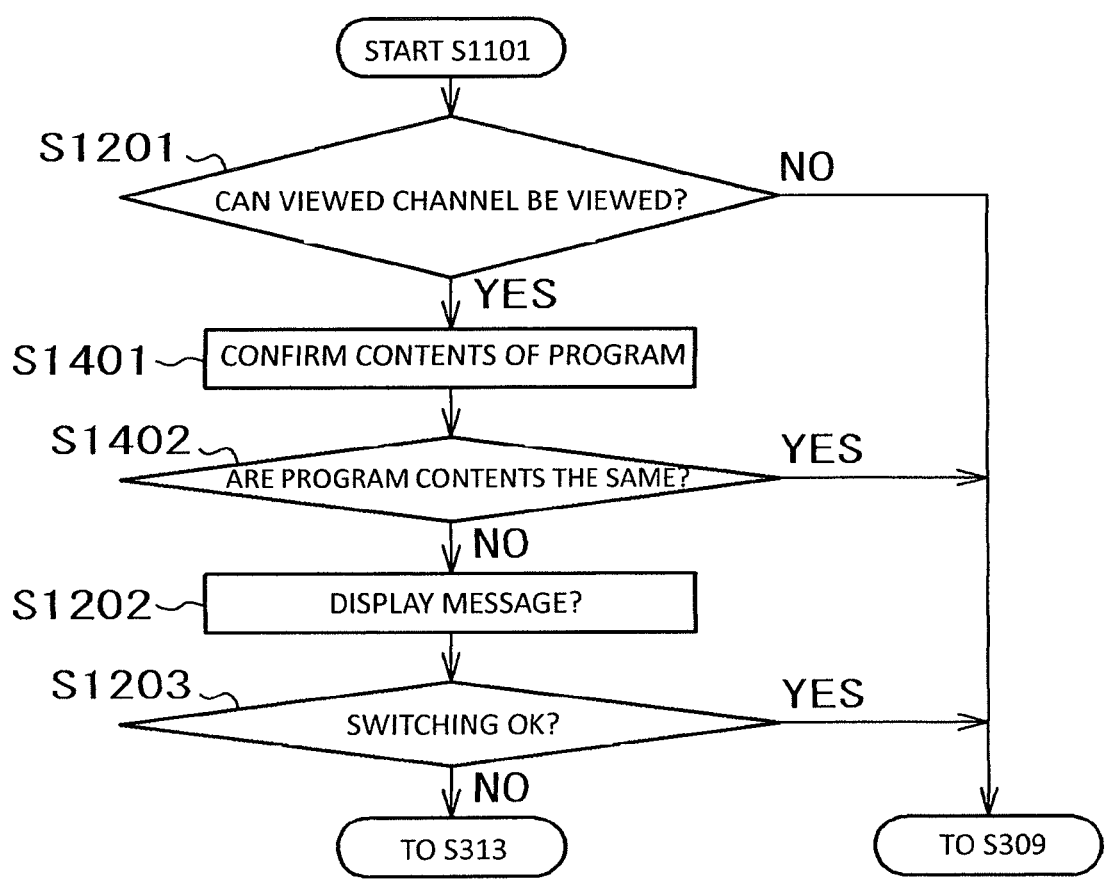
FIG. 14 is a third example of a flowchart showing in detail the operation of step S1101.

FIG. 14 is a third example of the process procedure in step S1101.

First, in the aforementioned step S1201, the control unit 17 acquires the signal quality value of the viewing section from the diversity combining and demodulating unit 13, and determines whether or not 12-segment broadcast or one-segment broadcast of the viewed channel is viewable. When 12-segment broadcast or one-segment broadcast of the channel is unviewable, the flow proceeds to step S309 for switching the channel to the found channel of a series broadcast station, when 12-segment broadcast or one-segment broadcast of the channel is viewable, the flow proceeds to step S1401. In step S1401, it is confirmed whether or not the program contents of the found series broadcast station is the same as the program contents of the currently viewed program. In order to confirm whether or not the program contents are the same, for example, when the receiver device 100 includes another video audio decoding unit, video and audio signals of the series broadcast station which have been subjected to the decoding processing may be compared with video and audio signals of the viewed program. Moreover, as another means, EIT (Event Information Table), which describes the information relating to program contents, may be extracted from the TS analysis unit, and determination can be made based on whether or not the program contents correspond to those of the viewed program. However, the means for confirming whether or not the program contents of the series broadcast station and those of the currently viewed program are the same may be any means since the effects of the invention cannot be lowered, or a plurality of means may be used in combination.

In step S1402, when it is determined that the program contents are the same, the flow proceeds to step S309, and a processing for switching the viewed channel to that of the series broadcast station. While when it is determined that the program contents are not the same, the aforementioned steps S1202 and S1203 are executed.

Figure 15:
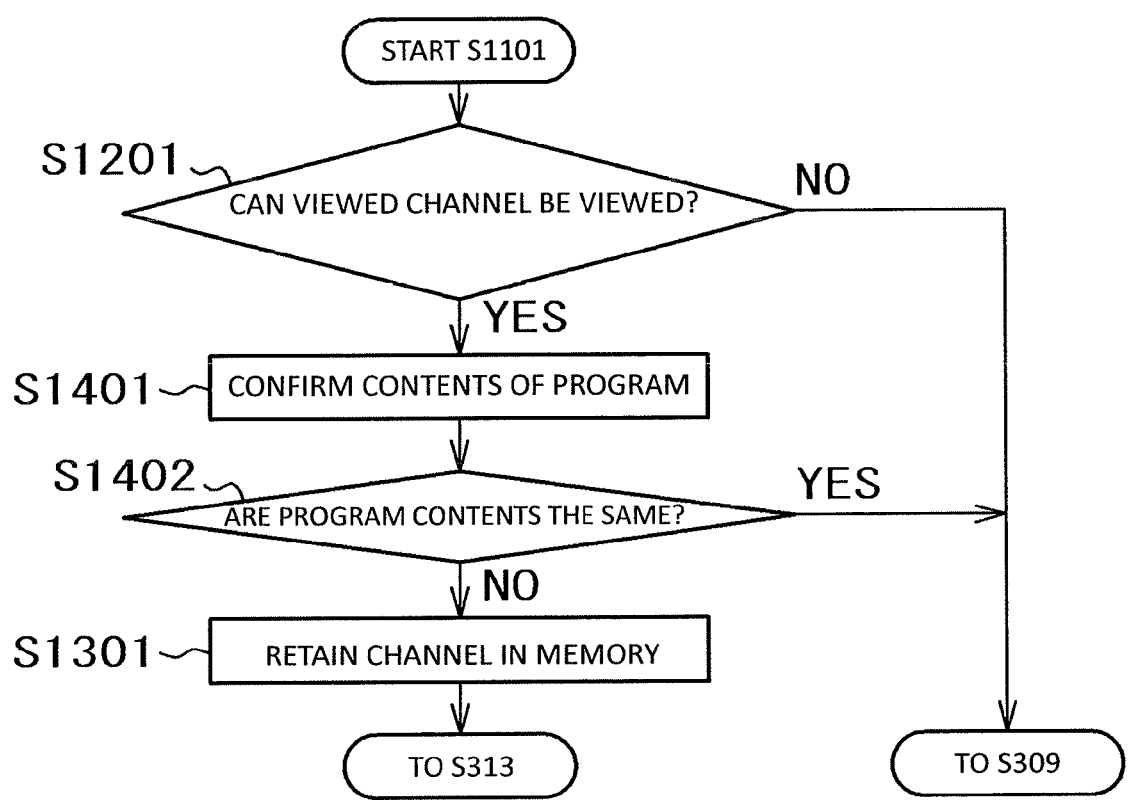
FIG. 15 is a fourth example of a flowchart showing in detail the operation of step S1101.

FIG. 15 is a fourth example of the process procedure in step S1101. In FIG. 15, as in the process of FIG. 14 mentioned above, it is determined whether or not the program contents of the found series broadcast station are the same as those of the viewed program. In step S1402, when it is determined that the program contents are not the same, the found channel of the series broadcast station is retained in the memory in step S1301. The channel retained in step S1301 is used as a channel to be searched first in a next process (steps S310 to S312) to search a series broadcast station. In such a manner, the problem that the search processing of series broadcast stations is terminated at the channel retained in step S1301 can be avoided.

As mentioned above, it is confirmed whether or not the program contents of the series broadcast station match those of the viewed program, and the channel is switched to the series station unconditionally only when they match, and therefore the user can continue viewing the same program contents.

In the embodiments of the present invention shown above, the receiver device 100 the constitution having the four tuning units 10a to 10d has been described, but the present invention can be readily made with any constitution having two or more tuning units. There are other possible examples of modified embodiments, which all fall within the scope of the present invention.

REFERENCE SIGNS LIST

100 . . . Receiver device, 10a to 10d . . . Tuning unit, 11a to 11d . . . Antenna unit, 12a to 12d . . . Channel selection unit, 13 . . . Demodulating and diversity combining unit, 14a, 14b . . . TS analysis unit, 15 . . . Video audio decoding unit, 16 . . . Output unit, 17 . . . Control unit, 18 . . . Operation unit, 19 . . . Location information detecting unit, 130a to 130d . . . Channel signal, 131a to 131d . . . Demodulating unit, 132a, 132b . . . Diversity combining unit, 133a, 133b . . . Transmission line decoding unit, 134 . . . TS Connecting unit.

The invention claimed is:

1. A receiver device which receives broadcast signals, the receiver device comprising a plurality of receiving units which receive broadcast signals and select a predetermined channel and demodulate the same, a combining unit which combines a plurality of demodulated signals output from the plurality of receiving units, a location information acquiring unit which acquires the information of the current location, and a control unit which controls a selection operation of the plurality of receiving units and a combining processing operation of the combining unit, the control unit,
when the receiving state of the broadcast radio wave is good, causing all of the plurality of receiving units to select and demodulate the same channel, and causing the combining unit to combine all of the plurality of demodulated signals to receive a program, and when the receiving state of the broadcast radio wave has deteriorated, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, and as a result of the first search, if no relay station with a better receiving state than that of the viewed channel is found, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive a program, wherein the control unit,
when the receiving state of broadcast radio wave has been further deteriorated and a program of a strong hierarchical layer is unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving unit for channel search and causing a predetermined candidate channel to be searched as a fourth search, when, as a result of the fourth search, the predetermined candidate channel is receivable, causing all of the plurality of receiving units to select and modulate the predetermined candidate channel, and causing the combining unit to combine all of the plurality of demodulated signals to receive a program, when, as a result of the fourth search, the predetermined candidate channel is unviewable, continuing searching of the predetermined candidate channel until a predetermined time is reached, when either the current program received channel or the predetermined candidate channel has become viewable before the predetermined time is reached, causing all of the plurality of receiving units to select and demodulate the channel of the viewable one, causing the combining unit to combine all of the plurality of demodulated signals to receive a program, when both of the current program received channel and the predetermined candidate channel are unviewable until the predetermined time is reached, causing the combining unit to combine the plurality of demodulated signals output by all of the plurality of receiving units, and causing a channel of a relay station or a series broadcast station of the viewed program to be searched using all of the plurality of receiving units as a third search.

2. A receiver device which receives broadcast signals, the receiver device comprising a plurality of receiving units which receive broadcast signals and select a predetermined channel and demodulate the same, a combining unit which combines a plurality of demodulated signals output from the plurality of receiving units, a location information acquiring unit which acquires the information of the current location, and a control unit which controls the selection operation of the plurality of receiving units, the combining processing operation of the combining unit, and the location information acquiring processing of the location information acquiring unit, the control unit, when the receiving state of the broadcast radio wave is good, causing all of the plurality of receiving units to select and demodulate the same channel, and causing the combining unit to combine all of the plurality of demodulated signals to receive a program, and when the receiving state of the broadcast radio wave has deteriorated, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, and as a result of the first search, if no relay station with a better receiving state than that of the viewed channel is found, comparing the current location acquired from the location information acquiring unit with a broadcasting region acquired from region identification information contained in TS of the viewed program, when the current location is within the broadcasting region, causing all of the plurality of receiving units to select and demodulate the current received channel, and causing the combining unit to combine all of the plurality of demodulated signals to receive a program, when the current location is outside the broadcasting region, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive a program, wherein the control unit, when the receiving state of broadcast radio wave has been further deteriorated and a program of a strong hierarchical layer is unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving unit for channel search and causing a predetermined candidate channel to be searched as a fourth search, when, as a result of the fourth search, the predetermined candidate channel is receivable, causing all of the plurality of receiving units to select and modulate the predetermined candidate channel, and causing the combining unit to combine all of the plurality of demodulated signals to receive a program, when, as a result of the fourth search, the predetermined candidate channel is unviewable, continuing searching of the predetermined candidate channel until a predetermined time is reached, when either the current program received channel or the predetermined candidate channel has become viewable before the predetermined time is reached, causing all of the plurality of receiving units to select and demodulate the channel of the viewable one, causing the combining unit to combine all of the plurality of demodulated signals to receive a program, when both of the current program received channel and the predetermined candidate channel are unviewable until the predetermined time is reached, causing the combining unit to combine the plurality of demodulated signals output by all of the plurality of receiving units, and causing a channel of a relay station or a series broadcast station of the viewed program to be searched using all of the plurality of receiving units as a third search.

3. The receiver device according to claim 1, wherein the case where the receiving state of the broadcast radio wave has been deteriorated is a case where a program of a weak hierarchical layer transmission in which the resistance to the influence caused by obstruction factors such as noise and fading in the received channel is relatively weak cannot be viewed, and a program of a strong hierarchical layer in which the resistance to the influences caused by these is relatively strong is being viewed.

4. A receiver device which receives broadcast signals, the receiver device comprising a plurality of receiving units which receive broadcast signals and select a predetermined channel and demodulate the same, a combining unit which combines a plurality of demodulated signals output from the plurality of receiving units, a location information acquiring unit which acquires the information of the current location, and a control unit which controls a selection operation of the plurality of receiving units and a combining processing operation of the combining unit, the control unit, when the receiving state of broadcast radio wave has been deteriorated and a program of a strong hierarchical layer has become unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, and as a result of the first search, if no relay station with a better receiving state than that of the viewed channel is found, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive a program, and when, as a result of the second search, any channel of a series broadcast station with a better receiving state than that of the viewed channel could not be found, causing the combining unit to combine the plurality of demodulated signals output by all of the plurality of receiving units, and causing a channel of a relay station or a series broadcast station of the viewed program to be searched using all of the plurality of receiving units as a third search, wherein the control unit, when the receiving state of broadcast radio wave has been further deteriorated and a program of a strong hierarchical layer is unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving unit for channel search and causing a predetermined candidate channel to be searched as a fourth search, when, as a result of the fourth search, the predetermined candidate channel is receivable, causing all of the plurality of receiving units to select and modulate the predetermined candidate channel, and causing the combining unit to combine all of the plurality of demodulated signals to receive a program, when, as a result of the fourth search, the predetermined candidate channel is unviewable, continuing searching of the predetermined candidate channel until a predetermined time is reached, when either the current program received channel or the predetermined candidate channel has become viewable before the predetermined time is reached, causing all of the plurality of receiving units to select and demodulate the channel of the viewable one, causing the combining unit to combine all of the plurality of demodulated signals to receive a program, when both of the current program received channel and the predetermined candidate channel are unviewable until the predetermined time is reached, causing the combining unit to combine the plurality of demodulated signals output by all of the plurality of receiving units, and causing a channel of a relay station or a series broadcast station of the viewed program to be searched using all of the plurality of receiving units as a fifth search.

5. A receiver device which receives broadcast signals, the receiver device comprising a plurality of receiving units which receive broadcast signals and select a predetermined channel and demodulate the same, a combining unit which combines a plurality of demodulated signals output from the plurality of receiving units, a location information acquiring unit which acquires the information of the current location, and a control unit which controls the selection operation of the plurality of receiving units, the combining processing operation of the combining unit, and the location information acquiring processing of the location information acquiring unit, the control unit, when the receiving state of broadcast radio wave has been deteriorated and a program of a strong hierarchical layer has become unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving units for searching the channel and causing the channel of a relay station to be searched as a first search, when, as a result of the first search, no channel of a relay station with a better receiving state than that of the viewed channel could be found, comparing the current location acquired from the location information acquiring unit with a broadcasting region acquired from region identification information contained in TS of the viewed program, when the current location is within the broadcasting region, causing all of the plurality of receiving units to select and demodulate the current received channel, and causing the combining unit to combine all of the plurality of demodulated signals to receive a program, when the current location is outside the broadcasting region, causing a channel of a series broadcast station of the viewed program to be searched as a second search, when, as a result of the second search, any channel of a series broadcast station with a better receiving state than that of the viewed channel is found, causing all of the plurality of receiving units to select and demodulate the channel of the series broadcast station found by the second search, and causing the combining unit to combine all of the plurality of demodulated signals to receive a program, and when, as a result of the second search, any channel of a series broadcast station with a better receiving state than that of the viewed channel could not be found, causing the combining unit to combine the plurality of demodulated signals output by all of the plurality of receiving units, and causing a channel of a relay station or a series broadcast station of the viewed program to be searched using all of the plurality of receiving units as a third search, wherein the control unit, when the receiving state of broadcast radio wave has been further deteriorated and a program of a strong hierarchical layer is unviewable, dividing the plurality of receiving units into ones for receiving the program and ones for searching the channel, and while causing the combining unit to combine a plurality of demodulated signals output by the receiving units for receiving the program to continue receiving the program, combining a plurality of demodulated signals output by the receiving unit for channel search and causing a predetermined candidate channel to be searched as a fourth search, when, as a result of the fourth search, the predetermined candidate channel is receivable, causing all of the plurality of receiving units to select and modulate the predetermined candidate channel, and causing the combining unit to combine all of the plurality of demodulated signals to receive a program, when, as a result of the fourth search, the predetermined candidate channel is unviewable, continuing searching of the predetermined candidate channel until a predetermined time is reached, when either the current program received channel or the predetermined candidate channel has become viewable before the predetermined time is reached, causing all of the plurality of receiving units to select and demodulate the channel of the viewable one, causing the combining unit to combine all of the plurality of demodulated signals to receive a program, when both of the current program received channel and the predetermined candidate channel are unviewable until the predetermined time is reached, causing the combining unit to combine the plurality of demodulated signals output by all of the plurality of receiving units, and causing a channel of a relay station or a series broadcast station of the viewed program to be searched using all of the plurality of receiving units as a fifth search.

6. The receiver device according to claim 1, wherein the channel received most recently for the currently viewed program is used as the candidate channel.

7. The receiver device according to claim 1, wherein the receiver device further includes a location information acquiring unit which acquires the current location information, and when the current location of a receiver is different from the broadcasting region of the viewed program, the channel received most recently for the currently viewed program is used as the candidate channel for a series broadcast station whose broadcasting region is the current location of the receiver.

8. The receiver device according to claim 1, wherein, when the first search is performed on the viewed program, the channel selected most recently which was receivable but its receiving state was worse than that of the viewed channel is used as the candidate channel.

9. The receiver device according to claim 1, wherein the receiver device further comprises a location information acquiring unit which acquires of the current location information, and if the current location of a receiver is different from the broadcasting region of the viewed program, when the second search is performed for the viewed program, the channel selected most recently which was receivable but its receiving state was worse than that of the viewed channel is used as the candidate channel for a series broadcast station whose broadcasting region is the current location of the receiver.

10. The receiver device according to claim 1, wherein the channels which are searched when a relay station search is executed are search target channels of the viewed program preset in advance at the time of product shipment are channels with the channel information used by the relay station described in the NIT of the viewed program channel added.

* * * * *